(12) United States Patent
Segall et al.

(10) Patent No.: US 8,738,010 B2
(45) Date of Patent: *May 27, 2014

(54) COOPERATING RECEIVER SELECTION FOR UMTS WIRELESS LOCATION

(71) Applicant: TruePosition, Inc., Berwyn, PA (US)

(72) Inventors: Edward Joseph Segall, Narberth, PA (US); Simon Issakov, Wayne, PA (US); Rashidus S. Mia, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,244

(22) Filed: Mar. 22, 2013

(65) Prior Publication Data

US 2013/0217412 A1 Aug. 22, 2013

Related U.S. Application Data

(63) Continuation of application No. 12/648,783, filed on Dec. 29, 2009, now Pat. No. 8,442,538.

(51) Int. Cl.
*H04W 36/00* (2009.01)

(52) U.S. Cl.
USPC ........ 455/442; 455/452; 455/433; 455/456.2; 455/432.1; 455/456.1; 370/333; 370/332; 370/342; 370/465

(58) Field of Classification Search
USPC ........................................................ 455/442
See application file for complete search history.

(56) References Cited

U.S. PATENT DOCUMENTS

| | | | |
|---|---|---|---|
| 4,728,959 A | 3/1988 | Maloney et al. |
| 5,327,144 A | 7/1994 | Stilp et al. |
| 5,608,410 A | 3/1997 | Stilp et al. |
| 5,945,948 A | 8/1999 | Buford et al. |
| 6,047,192 A | 4/2000 | Maloney et al. |
| 6,108,555 A | 8/2000 | Maloney et al. |

(Continued)

FOREIGN PATENT DOCUMENTS

WO    WO 2007/011974 A1    1/2007

OTHER PUBLICATIONS

3GPP TR 25.936 V4.0.1, "3$^{rd}$ Generation Partnership Project (3GPP); Technical Specification Group (TSG) RAN 3; Handovers for real-time services from PS domain; (Release 4)", Dec. 2001, 34 pages.

(Continued)

*Primary Examiner* — Charles Appiah
*Assistant Examiner* — Randy Peaches
(74) *Attorney, Agent, or Firm* — Baker & Hostetler LLP

(57) ABSTRACT

For Wireless Communications Networks (WCNs) that support soft handover, cooperator receiver selection for a TDOA, AOA, TDOA/AOA, or hybrid network-based or network-overlay Wireless Location System (WLS) must contend with one or more network base stations as a serving cell. When the active set contains more than one member, two techniques for determining a set of cooperating and demodulating receivers to use in the signal collection for location estimation is disclosed. In one embodiment, the active set members are constructively reduced to a single member that is used as a proxy serving cell. In another embodiment, the information contained in the active set membership is retained and a new set of demodulating and cooperator receivers are generated based on the entire membership of the active set.

22 Claims, 16 Drawing Sheets

(56) References Cited

U.S. PATENT DOCUMENTS

| | | | |
|---|---|---|---|
| 6,119,013 | A | 9/2000 | Maloney et al. |
| 6,122,270 | A | 9/2000 | Whinnett et al. |
| 6,360,098 | B1 | 3/2002 | Ganesh et al. |
| 6,546,256 | B1 | 4/2003 | Maloney et al. |
| 6,765,531 | B2 | 7/2004 | Anderson |
| 6,782,264 | B2 | 8/2004 | Anderson |
| 6,876,859 | B2 | 4/2005 | Anderson et al. |
| 7,023,383 | B2 | 4/2006 | Stilp et al. |
| 7,319,878 | B2 | 1/2008 | Sheynblat et al. |
| 7,340,259 | B2 | 3/2008 | Maloney et al. |
| 7,376,425 | B2 | 5/2008 | Laroia et al. |
| 7,440,762 | B2 * | 10/2008 | Maloney et al. ........... 455/456.1 |
| 7,616,828 | B2 | 11/2009 | Rahmes et al. |
| 8,055,270 | B1 | 11/2011 | Copeland et al. |
| 2006/0003775 | A1 | 1/2006 | Bull et al. |
| 2008/0167049 | A1 * | 7/2008 | Karr et al. ................. 455/456.2 |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0143018 | A1 | 6/2009 | Anderson et al. |
| 2010/0039320 | A1 | 2/2010 | Boyer et al. |
| 2011/0159876 | A1 | 6/2011 | Segall et al. |

OTHER PUBLICATIONS

3GPP TR 25.832 V4.0.0, "$3^{rd}$ Generation Partnership Project; Technical Specification Group Radio Access Network; Manifestations of Handover and SRNS Relocation (Release 4)", Mar. 2001; 13 pages.

3GPP TS 23.009 V8.2.0, "$3^{rd}$ Generation Partnership Project; Technical Specification Group Core Network and Terminals; Handover procedures (Release 8)", Sep. 2009, 292 pages.

3GPP TS 25.305 V8.1.0, "$3^{rd}$ Generation Partnership Project; Technical Specification Group Radio Access Network; Stage 2 functional specification of User Equipment (UE) positioning in UTRAN (Release 8)", Dec. 2008, 79 pages.

3GPP TS 24.008 V8.8.0, "$3^{rd}$ Generation Partnership Project; Technical Specification Group Core Network and Terminals; Mobile radio interface Layer 3 specification; Core network protocols; Stage 3 (Release 8)", Dec. 2009, 587 pages.

3GPP TS 25.331 V8.9.0, "$3^{rd}$ Generation Partnership Project; Technical Specification Group Radio Access Network; Radio Resource Control (RRC); Protocol Specification (Release 8)", section 8.3.4, Dec. 2009, pp. 245-251 (plus 2 cover pages).

International Patent Application No. PCT/US2010/061250: International Search Report Dated Feb. 16, 2011, 8 pages.

International Patent Application No. PCT/US2010/061241: International Search Report Dated Feb. 22, 2011, 2 pages.

* cited by examiner

| Primary Sector | Target Sector (1) | Target Sector (2) | Target Sector (n) |
|---|---|---|---|
| Sector A | Quality Metric (A1) | Quality Metric (A2) | Quality Metric (An) |
| Sector B | Quality Metric (B1) | Quality Metric (B2) | Quality Metric (An) |
| Sector C | Quality Metric (A1) | Quality Metric (A2) | Quality Metric (An) |

| Sector ZZZZZ | Quality Metric (ZZZZZ1) | Quality Metric (ZZZZZ2) | Quality Metric (ZZZZZ3) | Quality Metric (ZZZZZn) |
|---|---|---|---|---|

FIG. 2d

| Primary | Octant 1 | Octant 4 | Octant 7 | Octant 2 | Octant 5 | Octant 8 | Octant 3 | Octant 6 |
|---|---|---|---|---|---|---|---|---|
| Sector A | Sector ID | Sector ID | Sector ID | Sector ID | Sector ID | Sector ID | Sector ID | Sector ID |
| Sector B | Sector ID | Sector ID | Sector ID | Sector ID | Sector ID | Sector ID | Sector ID | Sector ID |
| Sector C | Sector ID | Sector ID | Sector ID | Sector ID | Sector ID | Sector ID | Sector ID | Sector ID |

| Sector ZZZZZ | Sector ID | Sector ID | Sector ID | Sector ID | Sector ID | Sector ID | Sector ID | Sector ID |
|---|---|---|---|---|---|---|---|---|

FIG. 2e

| Primary/Serving | 1st Co-op | 2nd Co-op | 3rd Co-op | 4th Co-op | 6th Co-op | 7th Co-op | 8th Co-op | 9th Co-op |
|---|---|---|---|---|---|---|---|---|
| Sector A | Sector ID | Sector ID | Sector ID | Sector ID | Sector ID | Sector ID | Sector ID | Sector ID |
| Sector B | Sector ID | Sector ID | Sector ID | Sector ID | Sector ID | Sector ID | Sector ID | Sector ID |
| Sector C | Sector ID | Sector ID | Sector ID | Sector ID | Sector ID | Sector ID | Sector ID | Sector ID |
| Sector ZZZZ | | | | Sector ID | Sector ID | Sector ID | Sector ID | Sector ID |

FIG. 2f

| Serving Cell | 1st Demod | 2nd Demod | 3rd Demod | Dth Demod |
|---|---|---|---|---|
| Sector A | Sector ID | Sector ID | Sector ID | Sector ID |
| Sector B | Sector ID | Sector ID | Sector ID | Sector ID |
| Sector C | Sector ID | Sector ID | Sector ID | Sector ID |
| Sector ZZZZ | Sector ID | Sector ID | | Sector ID |

FIG. 2g

| Co-op | Sector | Octant |
|---|---|---|
| 1 | 810 | 1 |
| 2 | 811 | 4 |
| 3 | 812 | 7 |
| 4 | 810 | 2 |
| 5 | 811 | 5 |
| 6 | 812 | 8 |
| 7 | 810 | 3 |
| 8 | 811 | 6 |
| 9 | 812 | 1 |
| 10 | 810 | 4 |
| 11 | 811 | 7 |
| 12 | 812 | 2 |
| 13 | 810 | 5 |
| 14 | 811 | 8 |
| 15 | 812 | 3 |
| 16 | 810 | 6 |
| 17 | 811 | 1 |
| 18 | 812 | 4 |
| 19 | 810 | 7 |
| 20 | 811 | 2 |
| 21 | 812 | 5 |
| 22 | 810 | 8 |
| 23 | 811 | 3 |
| 24 | 812 | 6 |

FIG. 8c

COOPERATING RECEIVER SELECTION FOR UMTS WIRELESS LOCATION

CROSS REFERENCE

This application is a continuation of U.S. application Ser. No. 12/648,783, filed Dec. 29, 2009, currently pending, which is hereby incorporated by reference in its entirety. This application is also related by subject matter to co-pending U.S. application Ser. No. 12/648,753, filed Dec. 29, 2009, currently pending, which is hereby incorporated by reference in its entirety.

TECHNICAL FIELD

The subject matter described herein relates generally to methods and systems for locating wireless devices using cellular radio networks and other types of voice or data wireless communications systems. More particularly, but not exclusively, the subject matter described herein relates to the use of measurements provided to the network by the mobile as part of normal operation to facilitate the selection of receivers to participate in the use of network-based location techniques to locate a mobile communications device in a Code Division Multiple Access spread spectrum based wireless communications system.

BACKGROUND OF THE INVENTION

Early work relating to network-based wireless location systems is described in commonly assigned U.S. Pat. No. 5,327,144 "Cellular Telephone Location System," which discloses a system for locating cellular telephones using time difference of arrival (TDOA) techniques. Further enhancements of the system disclosed in the '144 patent are disclosed in commonly assigned U.S. Pat. No. 5,608,410 "System for Locating a Source of Bursty Transmissions." Early art in the location of mobile devices via network-based Angle of Arrival (AoA) and Hybrids of AoA and TDOA include the commonly held U.S. Pat. No. 4,728,959; "Direction finding localization system"; U.S. Pat. Nos. 6,119,013 and 6,108,555 both entitled "Enhanced time difference localization system."

Enhancements for network-based wireless location systems for CDMA systems can be found in the commonly held U.S. Pat. No. 7,340,259 "Robust, efficient, localization system"; U.S. Pat. No. 6,546,256 "Robust, efficient, location-related measurement"; and U.S. Pat. No. 6,047,192 "Robust, efficient, localization system."

The ability of a CDMA-based system to maintain multiple legs between the mobile device and the network base station(s) is called "soft hand-off" (IS-95/IS-2000) or "soft-handover" (UMTS).

A soft handoff in a CDMA-based system occurs based on the beacon or pilot signal strength of several sets of base stations as measured by the mobile device (User Equipment (UMTS) or Mobile Station (IS-95/IS-2000)).

These sets are known in IS-95/IS-2000 variously as the active set, the neighbor set, the candidate set and the remaining set. In a UMTS system, the roughly corresponding sets of NodeB's are deemed the active, monitored and detected sets.

The active set is the set of base stations or NodeB's through which active communication is established. This definition of the active set applies to all aforementioned CDMA-based Wireless Communications System (WCNs).

In IS-95/IS_2000, the neighbor set is a set of base stations in proximity to the active base stations and includes base stations that have a high probability of having a pilot signal strength of sufficient level to establish communication, but through which active communication is not yet established. The remaining set is a set of base stations that have mobile detectable pilots, but are not of sufficient quality or power to be included in any of the other three sets.

In UMTS, in addition to the active set, two other mutually exclusive sets are defined. The "monitored set" includes non-active set cells nevertheless known to the network. In UMTS, these cells are included by the UTRAN in broadcast "CELL_INFO_LIST". "Detected set cells" are those cells detected by the mobile station (also called the User Equipment or UE), which are not known to the network. In UMTS, these cells are not found in the CELL_INFO_LIST or in the active set.

In CDMA (IS-95 and IS-2000), the active set members typically have higher measured pilot signals strengths relative to the neighbor, candidate set and remaining sets. The mobile uses these sets to help manage the handover/handoff process known as Mobile-Assisted Handover (MAHO). When communications between the network and mobile are initially established, a mobile communicates through radio signaling with a single base station, typically the base station with the highest received pilot power, but always a base station that meets the threshold for inclusion into the active set. During soft-handoff, the active set contains more than one base station. The mobile monitors the pilot signal strength of the base stations in the active set, the candidate set, the neighbor set and the remaining set. During handoff, when a pilot signal strength of a base station in the neighbor or remaining set reaches a defined threshold level, that base station is added to the candidate set and removed from the neighbor or remaining set by the mobile. When the mobile detects a relatively strong candidate pilot, the UE transmits a "Pilot Strength Measurement Message" (PSMM) to a Base Station Controller/Packet Control Unit (BSC/PCU) along with a request to add the base station of that pilot signal to the UE's active set. The PSMM report is evaluated by the BSC which coordinates the processing of a soft handoff with the base stations associated with the strong detected pilot signals.

In CDMA-based systems wireless communications systems, using the UMTS WCN as an example and source of nomenclature, the concept of a 'serving cell' has been replaced with one-way, two-way, three-way, etc. softhandoff handover (SHO) to take advantage of macrodiversity. In the downlink (NodeB-to-UE), macrodiversity is accomplished by combining, in the mobile's RAKE receiver, multiple copies of the downlink signal caused by either transmission from multiple antennas or by the multi-path corruption of the transmitted signal.

In the uplink direction, macrodiversity is accomplished through the use of multiple receive antennas collecting multiple copies of the UE transmitted signal. Since the UE transmitted signal is multi-path corrupted, multiple levels of signal combining can take place.

In all CDMA-based radio air interface wireless communications systems, detection of surrounding cell beacons is complicated by frequency re-use and the power control used to minimize the Near-Far effects.

The near-far problem is a classic co-channel interference (also called cross-talk) problem in cellular frequency reuse radio networks. The near-far problem arises from the fact that radio signals from transmitters closer to the receiver of interest are received with smaller radio path-loss attenuation than are signals from transmitters located further away. Therefore the strong signal from the nearby transmitter will mask the weak signal from the more distant transmitter.

In CDMA-based radio networks, the near-far co-channel interference is actively minimized using dynamic output power adjustment of the transmitters both in the uplink (UE-to-NodeB) and downlink (NodeB-to-UE) directions. With dynamic output power adjustment the closer transmitters (with less radio path loss) broadcast with less power so that the SNR for all transmitters at the serving receiver is roughly the same.

A network Wireless Location Services scenario may include hybrids with downlink and Satellite location techniques for a CDMA-based wireless communications network (WCN) such as the Universal Mobile Telephone System (UMTS). The UMTS WCN is fully specified by the 3rd Generation Partnership Project (3GPP) since December 1998.

Detailed descriptions of Radio messages, message elements, and parameters for UMTS can be found in technical specification document 3GPP TS 24.008 *"Mobile radio interface Layer 3 specification; Core network protocols; Stage 3"* and 3GPP TS 25.331 *"Radio Resource Control (RRC); Protocol specification"*

Detailed descriptions of the Wireless Location Systems standardized for UMTS are detailed in technical specification 3GPP TS 25.305 *"User Equipment (UE) positioning in Universal Terrestrial Radio Access Network (UTRAN); Stage 2"*. Details on handovers in the exemplary UMTS network can be found in 3GPP TS 23.009; *"Handover Procedures"*, 3GPP TR 25.832; *"Manifestations of Handover and SRNS Relocation"* and 3GPP TR 25.936; *"Handovers for real time services from PS domain"*.

The ETSI and 3GPP defined term LMU (Location Mobile Unit) is functionally equivalent to the ANSI defined term Position Determining Unit (PDE) or to the Signal Collection System (SCS) term as used in the cited TruePosition Patents. In a network-based WLS, consisting of geographically distributed receivers (LMUs) either overlaid in or integral to the local Wireless Communications Network with central server(s), the Serving-Mobile Location Center (SMC) connects to the core communications network. The central server(s) communicate with the WCN for the purposes of obtaining location triggers and collecting location tasking information which in this case includes the Active Set of the mobile of interest.

Prior U-TDOA systems required that at least one receiver, deemed the reference LMU receiver, to successfully demodulate at least part of the signal from the mobile of interest.

In a CDMA-based WCN with soft-handover, more than one LMU may be able to fully or partially demodulate the signal from the mobile of interest. The resultant full or partial signal demodulations may, via soft-combining, be used to reconstruct a replica of the original transmission that is less degraded than the best replica that could be obtained from any of the individual demodulations. This reconstructed reference signal is then made available to all LMUs involved in the location for correlation processing. LMUs that participate in the demodulation process are called "demodulating LMUs" or "demod LMUs." In addition to the demodulating LMU receivers, geographically neighboring or proximate LMUs ("cooperators" or "coop LMUs") may be tasked to collect signals from the mobile of interest for correlation with the reference signal. These cooperators may be an LMU, an LMU sector, or multiple antennas serving the same LMU. The set of potential cooperating LMUs also includes the demodulating LMUs. A "demod sector" is one LMU sector that is tasked for demodulation. A "coop sector" is one LMU sector that is tasked for cooperation. The problem of identifying which LMU sectors to task for demodulation is related to, but separate from, the problem of identifying which LMU sectors to task for cooperation. Although the techniques described herein may solve both problems, they may also be used to solving either problem independently of the other. Thus, for example, in an embodiment in which the WLS is not required to collect a reference signal because the reference signal is provided to the WLS by the WCN, the techniques described herein can be used to identify which LMUs to task for cooperation. In such a case the LMUs identified as demod LMUs by these techniques would be used only for cooperation and not for demodulation. Not every sector or cell may have a LMU installed (e.g., a sparse network deployment, as described in TruePosition's U.S. patent application Ser. Nos. 11/736,950, 11/736,920, 11/736,868 and 11/736,902; all entitled "Sparsed U-TDOA Wireless Location Networks"). Both coop sectors and demod sectors are limited to those sectors and cells that have an associated LMU.

Thus "serving sector" may refer to the coverage area of the serving cell. The term "LMU sector" may be used for that portion of an LMU responsible for receiving and processing radio signals from one receive antenna if receive diversity is not in use, or from multiple antennas located in close proximity to one another and providing diversity coverage of the same area if receive diversity is in use.

For network-based wireless location systems operating in a CDMA-based wireless communications network, selection of a most nearly optimal group of uplink receivers for network-based wireless location is problematic due to the power-control inherent in such networks and the resulting near far problem.

SUMMARY

For the wireless location system to dynamically task the numerically smallest, most geographically favorable set of receivers for a reliable TDOA and/or AoA based location and velocity calculation, the mobile device's Active Set may be obtained from the Wireless Communications Network and used to select from pre-determined lists of cooperating receivers and demodulating receivers or to construct new lists of cooperating receivers and demodulating receivers.

For Wireless Communications Networks (WCNs) that support soft handover, cooperator receiver selection for a TDOA, AOA, TDOA/AOA, or hybrid network-based or network-overlay Wireless Location System (WLS) must contend with one or more network base stations as a serving cell. In a WCN that supports soft-handoff, such as a CDMA (Code Division Multiple Access) based system, which can be a FDD (Frequency Division Duplex) or a TDD (Time Division Duplex) system, the concept of a serving cell or serving sector is more complicated. First, the mobile device may have multiple serving sectors (also known as active set members). Second, each sector may have differing numbers of transmission and reception antennae or, in TDD-based systems, use the same antenna for transmission and reception. When the active set contains a single member, the solution is straightforward and a cooperative receiver may be selected using a number of criteria or methods. When the active set contains more than one member, disclosed herein are two techniques for determining a set of cooperators and demodulators to use in the signal collection for location estimation.
1. In one embodiment, a first technique is referred to as the proxy method, since the active set members are constructively reduced to a single member that is used as a proxy serving cell.
2. In another embodiment, a second technique is referred to as the aggregate method, since information contained in the active set membership is retained and a new set of demodulating and cooperator receivers are generated based on the entire membership of the active set.

In both techniques, the selected cooperative and demodulating receivers are those that are likely to provide good TDOA and AoA coverage for the mobile device.

CDMA mobile stations and UMTS User Equipment are based on wide-band air interfaces and transmit at very low Eb/N0 levels compared to other narrow-band air interfaces (including GSM, TDMA and AMPS) for which UTDOA location systems have been widely deployed. To date, UTDOA deployments in CDMA/UMTS have been small enough to be practical to use every LMU receiver as a cooperator and a demodulator to each other LMU.

Due to the low Eb/N0 levels that are used, less margin of error is available for demodulating receiver and cooperating receiver selection when locating UMTS User Equipment. The disclosed techniques for selecting demodulating and cooperating receivers provide a mechanism for selection of demodulating and cooperating receivers that allow a CDMA-based UTDOA system to achieve the same or better location accuracy compared to accuracies achieved by comparable UTDOA systems for other air interfaces. The disclosed techniques may use fewer cooperators, thus allowing higher system throughput. Because the number of possible distinct Active Sets is extraordinarily high, it may not be possible to perform this selection in advance for all cases that may be encountered. Hence, any practical solution may benefit from the disclosed techniques.

The disclosed techniques are also applicable to a hybrid solution that use mobile-based OTDOA and/or assisted GPS (A-GPS) and network based Uplink Time Difference of Arrival (U-TDOA) technologies. Such technologies operate independently to obtain range estimates which can then be combined in a final hybrid location calculation or operate in a fallback mode where one location method is used when one or more of the other methods fail. Use of a hybrid wireless location system, using the disclosed concepts, creates an improved location solution with enhanced accuracy, yield, and performance. Methods of using network-based with mobile-based technologies, including satellite based downlink TDOA, were disclosed in TruePosition U.S. Pat. No. 7,440,762 "TDOA/GPS hybrid wireless location system" and in TruePosition U.S. patent application Ser. No. 12/192,057 "Hybrid GNSS and TDOA Wireless Location System."

The inventive techniques and concepts described herein apply to code-division radio communications systems such as the CDMAOne (TIA/EIA IS-95 CDMA with IS-95A and IS-95B revisions), the CDMA2000 family of radio protocols (as defined by the 3rd Generation Partnership Project 2 (3GPP2)) and the Wideband Code-Division Multiple-Access (W-CDMA) radio system defined by the 3rd Generation Partnership Project (3GPP) as part of the Universal Mobile Telephone System (UMTS). The UMTS model discussed herein is an exemplary but not exclusive environment in which the present invention may be used.

The present invention may be used in a network Wireless Location Services scenario including hybrids with downlink and satellite location techniques for a CDMA-based wireless communications network (WCN) such as the Universal Mobile Telephone System (UMTS). The UMTS WCN has been fully specified by the 3rd Generation Partnership Project (3GPP) since December 1998. The UMTS WCN with its Wideband CDMA (W-CDMA) radio air interface, also specified by 3GPP, will be used as an exemplary model throughout this document.

It should be noted that this summary is provided to introduce a selection of concepts in a simplified form that are further described below. This summary is not intended to identify key features or essential features of the claimed subject matter, nor is it intended to be used as an aid in determining the scope of the claimed subject matter.

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2d depicts the radio propagation study output of the average signal quality between each serving cell and its target cooperating and demodulating LMU sectors in a service area.

FIG. 2e illustrates the spiral algorithm in process, selecting the best cooperating and demodulating LMU sectors in order of radial segmentation and predicted signal quality.

FIG. 2f illustrates a representation of the initial cooperator lists.

FIG. 2g illustrates a representation of the initial demodulating LMU sector lists.

FIG. 8c depicts the output of the Spiral Algorithm as implemented for Aggregate Method 1—Construction of new cooperators in a round-robin fashion based on octants of active set members.

DETAILED DESCRIPTION OF ILLUSTRATIVE EMBODIMENTS

Figure 1:
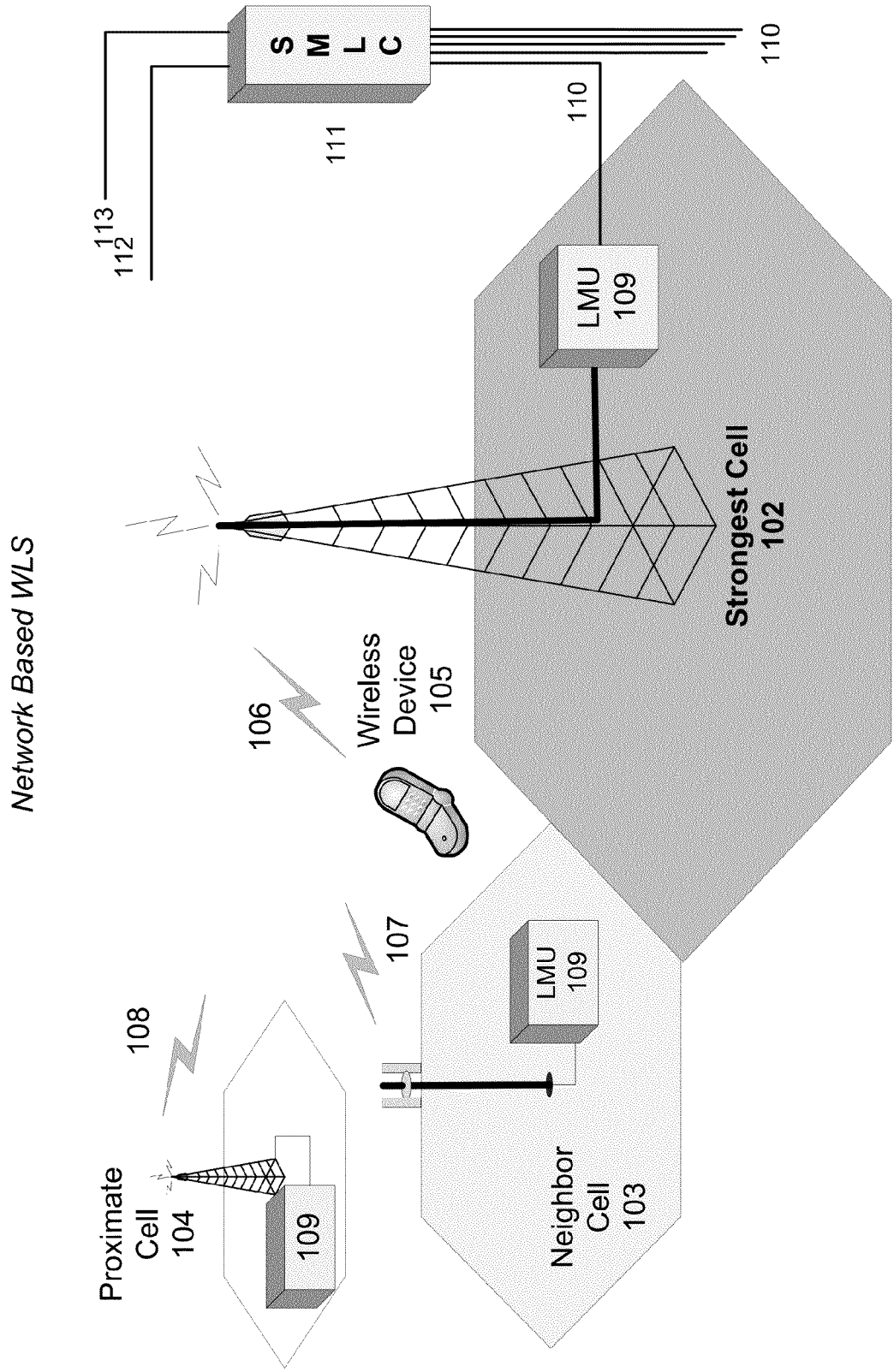
FIG. 1 illustrates a network-based wireless location system (WLS).

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

We will now describe illustrative embodiments of the present invention. First, we provide a detailed overview of the problem and then a more detailed description of our solutions.

One of the main advantages of wide-band, spread spectrum CDMA-based wireless communication systems is the capability of combining multiple signals that arrive in the receivers with different time delays. Unlike narrowband systems, CDMA-based wireless systems do not use equalization to mitigate the negative effects of multipath, but rather combines the multipath signals (known as 'rays') using a RAKE receiver.

A RAKE receiver contains multiple demodulators, called 'fingers'. Each finger searches for rays and feeds the information to the other fingers of the RAKE receiver. Each finger then demodulates the signal corresponding to a strong ray. The results from each finger are then combined together to improve the signal quality.

In CDMA-based wireless communications systems, the techniques of soft-handover (SHO) and softer-handover (also SHO) are used to take advantage of the performance enabled by multipath combining allowing improvement the voice or data quality as delivered with the caprices of the radio air interface. Using macrodiversity, signals from the antennas of the local base station can be combined to enhanced the received signal (softer-handover) and signals from other local base stations can be collected and merged (soft-handover) at the base station or radio network controller.

Using the 3GPP defined UMTS system as an example of a functional wideband, spread spectrum CDMA-based wireless communication network, it can be shown that network and signal information can be obtained to improve the performance of the Wireless Location System as to accuracy, latency, and cost.

Network-based Wireless Location Systems require a minimum of three receivers (or two in the case of Angle-of-Arrival only based systems) to calculate a location estimate via algorithms known as Triangulation (AoA) and Trilateration (TDOA). In practice, many more receivers are typically needed to maximize location accuracy.

Network-based WLSs using multi-lateration (and multi-angulation in combination) can improve the location accuracy by selecting only the receiver sites with the best reception (as determined by the signal quality, e.g., the SNR). Each pair of receiver sites forms a baseline pair from which the location estimation and velocity estimation calculations are performed. Inconsistencies between the received timing and the expected timing can also be used with SNR as additional or substitute receiver selection criteria.

The baseline method for TDOA/FDOA determination in a network-based wireless location system uses signal correlation between a reference and local signal where the reference and local signals are collected over the same interval, as extended and adjusted for expected propagation delay, using different antennas via synchronized receivers.

FIG. 1

FIG. 1 depicts a network-based wireless location system (WLS). The WLS overlays or is integrated into the wireless communications system (shown here as the strongest cell 102, neighbor cell 103 and proximate cell 104). A wireless device 105 is shown in soft-handoff with the local cells 102 103 104 via radio signaling paths 106 107 108. Location Measurement Units (LMUs) 109 are geographically distributed to receive the uplink radio signals emitted by the mobile device 105. The LMUs are connected via digital data links 110 to the SMLC 111. The SMLC 111 or Serving Mobile Location Center manages the operations, maintenance, and provisioning of the LMUs 109 as well as providing interconnection between the WLS and other wireless communications network nodes. The SMLC receives triggering and tasking information from the WCN via a digital datalink 112 such as the J-STD-036 defined E5 interface, the ETSI defined Lb interface, the 3GPP defined Iupc interface and/or the ATIS defined Lbis interface. If deployed in conjunction with a link monitoring system (LMS), the SMLC may support an alternate triggering interface 113 for triggering and tasking formation from the LMS. The LMS is further detailed in commonly assigned U.S. Pat. Nos. 6,782,264 and 7,023,383 both entitled "Monitoring of call information in a wireless location system" and commonly assigned patent application Ser. No. 11/150,414 "Advanced triggers for location-based service applications in a wireless location system".

In the network-based WLS, received signals are collected using wideband receivers (LMUs 109) preferably using geographically distributed antenna sites.

The reference antenna (or site) and cooperators are selected based on received signal characteristics, a pre-planned scheme based on signal propagation modeling or other criteria which can include the serving cell or active set membership for a mobile device.

Each of the LMU 109 receivers digitizes the radio transmission received on the channel of interest. The acquired signal of interest (SOI) or portions of the SOI is demodulated by the reference receiver and distributed to the cooperating sites. Additional information on the specifics of this technique may be found in the commonly held U.S. Pat. No. 5,327,144; "Cellular telephone location system" and U.S. Pat. No. 6,047,192; "Robust, efficient, localization system."

The reference and local signals, a set of digitized samples collected over the sample duration, are then correlated with a set of likely time-offsets (range) and frequency-offsets (Doppler and drift) to create a three dimensional search space of correlation amplitude, range, and Doppler/drift (as per commonly assigned U.S. Pat. No. 6,876,859; "Method for estimating TDOA and FDOA in a wireless location system").

The said correlation procedure is repeated for each cooperating LMU 109 receiver. The correlation output may be edited to remove interference. Additional information on the specifics of the digital editing technique may be found in the commonly assigned U.S. Pat. No. 6,765,531; "System and method for interference cancellation in a location calculation"

Geometric dilution of precision (GDOP) measures the sensitivity of location accuracy to the geometry of a TDOA and/or AoA system's receiving antennas relative to a transmitting mobile device. GDOP can be viewed as an error multiplier that can boost or degrade the performance of a location system. For example, if the TDOA multi-lateration process has measured every baseline in a location estimate with an accuracy of X, and the geometry of the antennas resulted in a GDOP of Y, then the expected error of the final location estimate is X*Y.

UTDOA location accuracy is highly dependent on obtaining a reference signal obtained via partial demodulation and reconstruction by a limited number of LMUs and on selecting good cooperator sites. Limiting the number of LMUs is important because if all LMUs in the WLS were tasked to obtain a reference signal, those LMUs would be unavailable to perform other locations during the same time period. This would severely impact the availability of service (capacity and latency) of the WLS.

In order to improve reference signal detection without undue impact to availability, a few LMU's (the demodulating LMUs) are tasked to attempt to demodulate the reference signal or portions of the reference signal such as the midamble and the best one is selected (or they are combined) at a later time. The initial selection of which LMUs will be tasked for demodulation or cooperation is static. The selection is performed once during system configuration for each cell in the wireless system.

While the selection of which LMUs will be tasked for demodulation or cooperation can take into account many aspects (such GDOP or the distance between baseline pairs) in selecting the best sites, multi-path propagation and fading cannot be considered unless an extensive and expensive drive test is performed after each system reconfiguration. Modeling of the radio propagation environment has thus far proven insufficient to substitute for drive testing. In some cases the best cells for detecting and demodulating the reference signal are not the cells that are close to the mobile of interest. Subsequent revision of the initial 'static' demodulation or cooperation lists as the WCN changes or additional drive test and survey data become available is possible. Revision of the lists using historical information in creating the static list is also possible (see commonly assigned U.S. patent application Ser. No. 11/948,244, Automated Configuration of a Wireless Location System).

In an exemplary UMTS WCN, "Soft Handover" (SHO) is a state in which a few cells are simultaneously receiving and transmitting data to the same mobile device. A cell, in UMTS, corresponds to an antenna array with a defined radio coverage area. A UMTS cell may be an omni-directional cell or a sectored cell which uses a directional antenna array to define and serve the coverage area. One or more omni-directional or sectored cells may be sited at a single cell site.

With macrodiversity/soft handover the UE combines more than one radio downlink from the local NodeB(s) to improve the reception quality. Although the maximum number of Radio Links that a UE can simultaneously support is eight, the number used for SHO can vary dynamically in the range of 1 to 6 under the control of the radio access network.

In general, when an RRC connection is established, it first must be established on one cell. The UMTS network initiates Intra-Frequency measurements at the UE to determine if any other cells are suitable. Suitable cells have a CPICH (common pilot channel) strength (as measured by Ec/Io) above the dynamic threshold value [Best_SS−AS_TH+AS_Th_Hyst] for deltaT seconds. If a cell CPICH meets this threshold and the Active Set is not yet full (or if the measured CPICH is better than an existing Active Set member's CPICH strength plus As_Rep_Hyst for deltaT seconds) then the cell is suitable.

When a suitable cell is found then Active Set Update procedure (3GPP TS 25.331 "Radio Resource Control Protocol Specification", section 8.3.4) is initiated. Using the Active Set Update message, the network adds or deletes one (or more) radio link(s) to the UE. The only requirement is that from the start until the end of this Active Set Update procedure, one Radio Link should remain common.

Since cells are added or removed from the Active Set based on RF measurement reports created at the mobile/UE, cells in the Active Set are likely to be very good candidates for demodulation and cooperation for network-based wireless location methods.

Location Calculations in a TDMA/FDMA Wireless Communications Network

High precision network-based wireless location techniques that are field proven and in currently in wide usage include UTDOA (Uplink Time Difference of Arrival), Angle of Arrival (AOA) and U-TDOA/AoA hybrids.

Uplink Time Difference of Arrival (UTDOA) determines a mobile phone's location by comparing the times at which a cell signal reaches multiple Location Measurement Units (LMUs).

Angle of Arrival (AOA) determines a mobile phone's location by comparing the angle developed by a multiple element antenna array in which the exact location of each antenna element is known precisely with the angle developed by another multiple element antenna. Each element is capable of separately receiving the uplink radio signal. By measuring signal strength, time of arrival, and phase at each element of the array, it is possible to calculate the line-of-sight path (bearing line) from the mobile device to the AoA array. Use of two or more AoA equipped LMUs generates multiple bearing lines. A location estimate can be calculated from where the bearing lines cross.

Network-based Hybrid Location solutions using combinations of Cell ID (CID), signal power measurements, Enhanced Cell ID (E-CID), Angle of Arrival (AOA), and Uplink Time Difference of Arrival (U-TDOA) can be used to increase location accuracy and yield in a geographic service area.

In a TDMA (Time Division Multiple Access), FDMA (Frequency Division Multiple Access), FDD (Frequency Division Duplex) system, such as GSM, a serving cell (generally the cell with the best measured radio signal as received by the mobile station) is identified to the WLS by the WCN or Link Monitoring System (LMS) along with radio channel information needed to tune the geographically distributed antennas connected to LMU receivers. A serving cell is also known as a serving sector (in the case of sectorized base stations) or as a serving antenna pair (a cellular sector nominally has at least a transmission antenna and receiving antenna). Use of receiver diversity adds additional receive antennas to a sector. In this application, the term sector will be used for the radio coverage area of a receiver antenna or diversity receiver antenna(s) regardless of the nature of the cell site (Omni-directional or sectored). Thus "serving sector" will refer to the coverage area of the serving cell.

Prior to activation, an extensive design phase is typically conducted on the network-based WLS, where optimal siting of LMUs (please see commonly assigned U.S. patent application Ser. No. 11/736,950; "Sparsed U-TDOA Wireless Location Networks", Filed Apr. 18, 2007; U.S. patent application Ser. No. 11/736,920; "Sparsed U-TDOA Wireless Location Networks"; Filed Apr. 18, 2007; U.S. patent application Ser. No. 11/736,902; "Sparsed U-TDOA Wireless Location Networks"; Filed Apr. 18, 2007; and U.S. patent application Ser. No. 11/736,868 "Sparsed U-TDOA Wireless Location Networks"; Filed Apr. 18, 2007) and accuracy estimations over the geographic service area are calculated. As part of the design phase, lists of predetermined cooperative LMU receivers (coop or cooperator lists) and lists of predetermined secondary demodulation candidate LMUs (demod lists) are generated for each sector of the WCN.

The initial cooperator list and demodulator list generation process models the radio path loss between an LMU sector receiver antenna(s) and a theoretical point (a marker point or sample point). The modeled radio path loss is used to determine the value of a quality metric for the radio path between each marker point and a receiver antenna. In this example, the extended COST231-Hata radio propagation model will be used.

One or more marker points are used to represent the coverage area of each cell. Marker point placement can be performed using a number of techniques including uniform geographic distribution, selective placement based on radio propagation mapping, and random placement via a Monte Carlo or other stochastic probability technique. Simple geometric placement will be used herein to illustrate the initial marker placement.

Figure 2A:
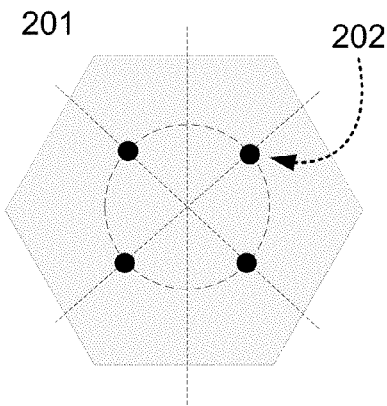
FIG. 2a depicts an example selection of representative marker points in an omni-directional cell.
Figure 2B:
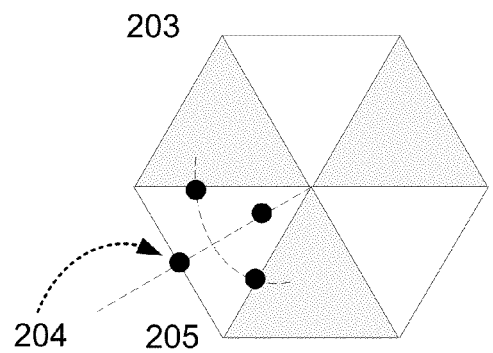
FIG. 2b depicts an example selection of representative marker points in a cell in a sectored cell site.

FIGS. 2a and 2b illustrate examples of representative marker points calculated from a simple geometric model. FIG. 2a depicts an illustrative example of the representative marker points as calculated from a simple geometric model overlaid on the coverage area of a omni-directional antenna (single cell) cell site 201. The (n=4) marker points 202 are distributed around the antenna site 206 at a constant radius 204 along (n=4) individual equally distributed radials 205.

FIG. 2b depicts an illustrative example of the representative marker points as calculated from a simple geometric model overlaid on one sector of a six sectored cell site 203. The current sector 205 is overlaid with a simple geometric model. The (n=4) marker points 204 are arranged along the midpoints of the nominal sector edges and at ⅓ the nominal sector depth.

Using geographic and wireless communications system specifications and/or survey information, the location of each receiver antenna is determined. In the case of multiple receiver antennas in a cell, a single representative point can be chosen for all of that cell's receive antennas, or calculations can be performed as if each receive antenna were associated with a unique cell.

The geographical location and other cell site information for non-LMU cells are known in the SMLC and used in generation with cooperator and demod sector lists for those non-LMU sectors. A non-LMU sector can only be a serving cell and not a cooperator or demod sector.

It is necessary to determine which LMU sectors to use for cooperation and/or demodulation in performing locations for any cell in the serving area. The following is an example procedure for determining an initial cooperator and demod sector list for any cell using the marker points for that cell determined by any of the above marker point placement methods to represent its coverage:

For each cell in the service area, perform the following steps 1-4:
1. Select all other LMU sectors (target sectors) within a defined range (this value may vary based on the network propagation modeling and can be unique to each cell).
2. Define n representative coverage points (the marker or sample points). In FIGS. 2a and 2b, the marker points are uniformly distributed over the expected coverage area of the current cell. In practice, four markers are typically used.
3. Compute the expected path loss from all the markers to each of the selected target sectors using a selected radio propagation model to represent the radio channel. This modeling may be refined using drive test data to improve the model.
4. Average the results of the path loss modeling into a single quality metric representing the predicted radio link quality between the current cell and each selected target sector, and save these values for later use. The type of averaging used can be a simple arithmetic mean, a geometric average, or other averaging calculation appropriate to the propagation model. Averaging can be performed using any appropriate representation of the path loss including a direct ratio or a logarithmic representation (for example, in decibels) of that ratio.

FIG. 2d depicts an example of a table that represents, for all pairs consisting of one serving cell and one target sector, the averages saved in step 4.

Figure 2C:
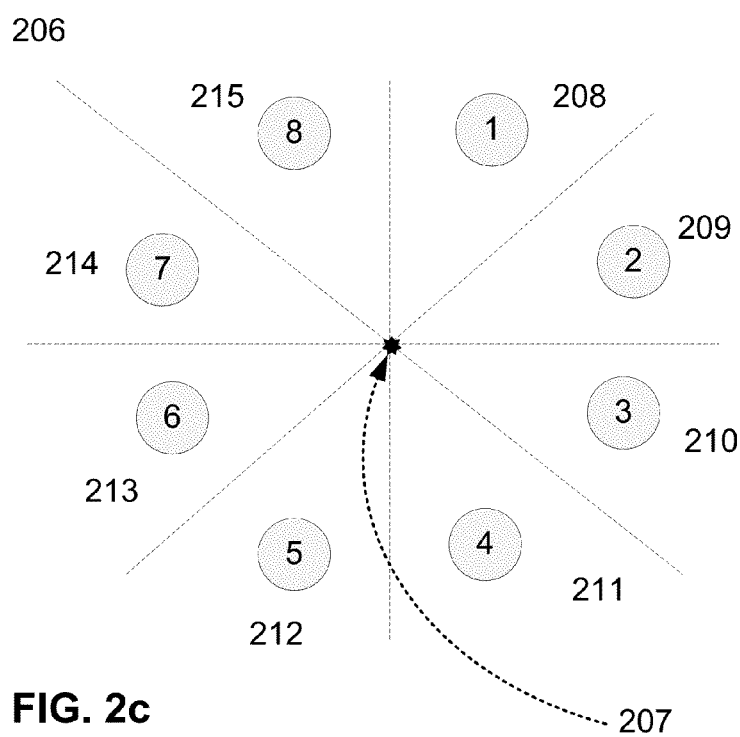
FIG. 2c depicts the radial segmentation and spiral algorithm pattern for cooperative and demodulating LMU sector selection.

To generate the cooperating sector list and demod sector list for a call served by a cell C, perform the "spiral algorithm" detailed in the following steps 5-10:
5. Subdivide the area surrounding C's receive antenna(s) into m radial segments. A representative point such as the centroid of C's coverage area or the location of the base station hosting C may be used for the center of the radial pattern. This point may be referred to as the central point. In practice, m=8 has been shown to provide useful results in a variety of network topologies. FIG. 2c illustrates an example for a serving sector where m=8, thus dividing the area surrounding the current sector into octants. Each octant is then numbered clockwise, from 1-to-8.
6. For each octant, create a list, called the target sector list, containing the quality metric values and sector identification information for the target sectors of the current cell using the information saved in step 4 above.
7. Starting from any octant, select the target sector with the best quality metric in that octant and move it to the cooperator listing from that octant's target sector list.
8. To increase spatial symmetry (and thus lower GDOP) during initial passes around the current sector's representative point, the pattern 1-4-7-2-5-8-3-6 (repeated as needed) or a similar non-sequential pattern may be used in the selection of the next octant. For each octant in turn, select the target sector with the best quality metric and move it to the cooperator listing from that octant's target sector list.
9. Repeat the selection of octants and the election of yet-unelected target sectors to the cooperative receiver list based on the best remaining quality metric until the target number of cooperators is reached or no more target sectors remain in any of the octants.
10. Note the path loss to the last target sector added. Examine all LMU sectors previously added to the cooperator list and for each such sector, add to the cooperator list every LMU sector not already on the cooperator list connected to an antenna that is located in close geographic proximity to its antenna and has average path loss low enough to plausibly be capable of performing a baseline measurement.
11. For the current cell, create the demod sector list using that cell's D best target sectors (highest power or lowest path loss) from the quality metric table. (The value of D varies according to the network characteristics, but generally falls between 2 and 10). Order this list by quality metric, such that the first list entry has the highest quality metric, the second list entry (if any) has the second-highest quality metric, and so on. Examine all LMU sectors previously added to the demod list and for each such sector, add to the demod list every LMU sector not already on the demod list whose antenna is located in close geographic proximity to its antenna, regardless of estimated path loss.

Steps 5-10 can be performed any time before tasking LMUs for data collection.

If Angle of Arrival (AoA) capability is installed for the current cell, then a separate AoA cooperator list will be generated by adding all AoA equipped LMU sectors within range (the AoA range varies on a per cell basis) that contain any of the current marker points within the footprint of the AoA antenna array's beam.

FIG. 2c illustrates the segmentation of the area surrounding the current cell 206. The segmentation takes place radiating from the central point 207. The central point can be the location of the cell antenna or the centroid of the sector (as calculated from the intersection of the sector bisector and the midpoint of the sector reach). Each segment 208 209 210 211 212 213 214 215 is numbered here as 1-8 so that the distributive effect of the spiral algorithm can be shown.

FIG. 2d details the lists of calculated signal metric between each serving cell and target LMU sector as determined by the average signal quality metric from each marker point within a serving cell.

FIG. 2e illustrates the progress of the spiral algorithm as for each serving cell, it steps through the radial segments (nominally octants) in the selection 1-4-7-2-5-8-3-6 order used to distribute cooperators to avoid high GDOP resulting from poorly distributed cooperators.

An exemplary initial cooperator list in a tabulated format is detailed in FIG. 2f. For each cell included in the service area (the Serving Cell), the cooperator list for that cell consists of a list of cooperating LMU sectors, in the order they were selected by the spiral algorithm.

An exemplary initial demod LMU sector list in a tabulated format is detailed in FIG. 2g. For each cell included in the service area (the Serving Cell), the demodulator list for that cell consists of a list of demod LMU sectors in the order they were selected in step 11 above.

The described procedure selects initial cooperators in an order that balances priority between signal strength and GDOP. Signal strength is prioritized by selecting LMU sectors located within each segment in the order of strongest predicted signal strength over the serving sector. GDOP is prioritized by sequencing through the octants while selecting cooperating receivers, thus ensuring that the cooperating receivers surround the serving sector. Balance between these priorities is achieved by alternating in this way between selecting the best LMU sector in each octant and stepping to the next octant. Each cell has its own order of favored LMU sectors, from most to least advantageous. At location time, the Initial Coop List is used to determine which LMU receivers and associated receiver antennas are considered for signal collection and correlation.

For Location Calculations in a Wireless Communications Network with Soft-Handoff/Softhandover In a WCN that supports soft-handoff/handover, such as a CDMA (Code Division Multiple Access) based system, which can be a FDD (Frequency Division Duplex) or a TDD (Time Division Duplex) system, the concept of a serving cell or serving sector is more complicated. For a network-based Wireless Location System (WLS) to function in Wireless Communications Networks (WCNs) that support soft-handoff/softhandover, cooperative (and demod) receiver selection for a TDOA, AOA, TDOA/AOA, or hybrid network-based or network-overlay Wireless Location System (WLS) must contend with one or more serving cells.

The mobile device may have multiple serving cells (also known as active set members). Furthermore, each cell may have differing numbers of transmission and reception antennas or, in TDD-based systems, use the same antenna for transmission and reception.

When the active set contains a single member, the cooperative receiver selection procedure using the initial cooperator and demod sector lists as described above may be used.

When the active set contains more than one member, the methods disclosed herein may be used to select cooperators and demod LMU sectors to use for signal collection. Two categories of methods are described herein, with several methods in each category presented in detail.

The first category of methods is called proxy methods, since these methods choose one member of the active set to use as a proxy serving cell. The second category of methods is called aggregate methods, since the composition of the active set is used in its entirety (i.e. in the aggregate) to select demod and coop sectors. In both categories, the selected cooperative and demodulating receivers are very likely to provide good TDOA and AoA coverage for the mobile device.

Proxy Methods for Location Calculations in a Wireless Communications Network with Soft-Handoff/Softhandover When locating a call and the mobile device's Active Set contains more than one member, the designer may elect to discard potentially useful information provided by the composition of the active set and distill the active set's data into a single serving cell for the purpose of selecting cooperators. This single representative cell is deemed a proxy serving cell and the cooperative receiver selection procedures using this proxy serving cell may be referred to as proxy methods. Once a proxy has been selected, a cooperative receiver list based on the proxy is determined. Proxy methods retain information about the active set for demod sector list generation because the best known demod sector candidates are those associated with the active set members themselves. Thus, all active set members having a connected LMU are included first in the demod sector list before (thus at a higher priority than) other demod sectors. If the number of active set members having a connected LMU is more than the limit D from Step 11 above, the number of active set members takes precedence. (The value of D varies according to the network characteristics, but generally falls between 2 and 10). Other lower-priority demod sectors are selected based solely on the proxy cell, using the procedure detailed in Step 11 above, up to but not beyond the limit D.

Most of the work required to perform proxy cooperator selection can be pre-computed in the form of the static list for the cell used as a proxy. Real time tasks may comprise: (1) select a representative (proxy) serving sector and use its pre-computed coops, and (2) augment the proxy cell's list of demod sectors by prepending all active set members that are not already on the list. This class of techniques is especially suitable for mixed mode systems (such as GSM/UMTS) where multi-mode LMUs may be locating both TDMA/FDMA and CDMA mobile devices.

Figure 3:
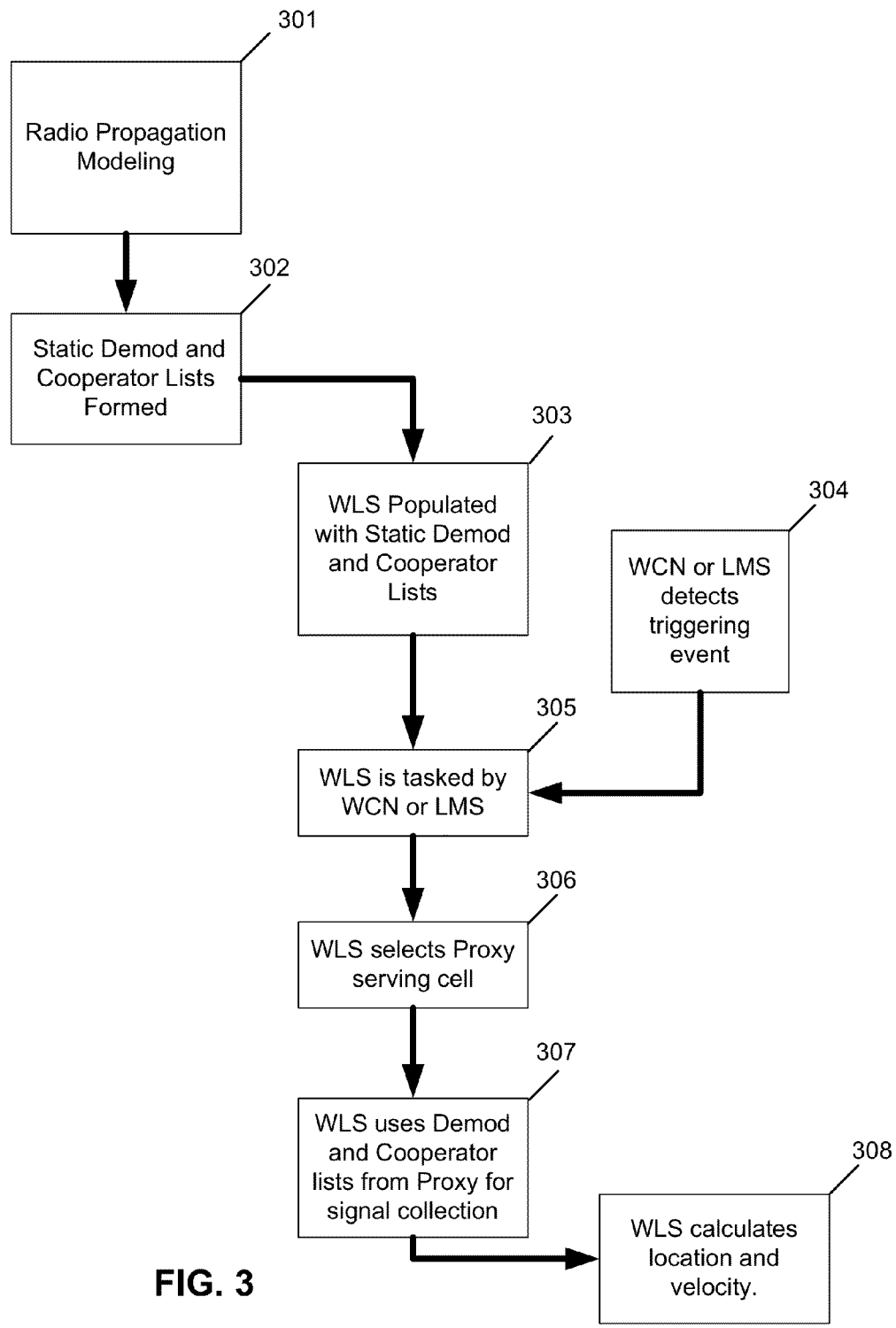
FIG. 3 illustrates the general operative steps in performing a Proxy Method for selection of cooperative and demodulating LMU sectors for a network-based wireless location system.

FIG. 3 depicts a high-level procedure for proxy determination and location using the proxy serving cell.

During or prior to deployment, a radio propagation model with a network topology which may be enhanced by the addition of geographic topography, building shadowing models, and drive test collected signal data is created for the service area 301. This radio propagation model is used to determine the initial cooperator list and demod sector list for any cell in the WLS service area 302.

The deployed wireless location system is populated with the initial lists 303. These lists will be used in the case of one-way handoff (single active set member) and in the proxy sector technique.

At some time after deployment, the WCN or LMS detects a triggering event 304; examples of triggering events include 9-1-1, 1-1-2 emergency calls. Additional triggers are detailed in commonly assigned U.S. patent application Ser. No. 11/150,414 "Advanced triggers for location-based service applications in a wireless location system".

The WCN or LMS passes the triggering information and tasking information to the WLS 305. The tasking information includes the active set membership. If the WLS detects multiple active set members (the mobile device is in soft-handoff/softhandover), then the WLS may elect, based on the designer or deployer's option, one of the three proxy methods 306.

In some embodiments, the radio propagation modeling 301 may have been performed, but the generation of the initial coop and demod lists 302 may not be performed until after tasking information has been received. The radio propagation modeling 301 and generation of the initial coop and demods 302 to pre-populate the WLS 302 may require less computational load to be executed after tasking information has been received and before signal collection can begin. Similarly, in some embodiments both the radio propagation modeling 301 and the generation of the initial coop and demod lists may not be performed until after tasking information has been received. All such choices are a designer's option.

Once in a proxy method, the WLS selects a proxy serving cell 306 and retrieves (or computes) the associated cooperator and demod sector lists, adding any non-included LMU sectors associated with the active set to the cooperator and demod sector lists. For tasking LMUs, membership in the active set may be a better indicator of usefulness as a cooperative receiver or demodulating receiver than using proximity as an indicator. The WLS collects radio signals via the specified LMUs 307. The WLS then uses the collected radio signals to calculate a location estimate and velocity estimate using TDOA, TDOA with AoA, or via hybrid techniques 308.

Proxy Method 1—Select the Active Set Member Nearest to Centroid as the Proxy

One way to select a proxy serving cell when the active set contains two or more members is to find the cell closest to the centroid of the active set members. The centroid may be found by averaging (separately) the x and y geographic coordinates of the individual sites. Alternately, the centroid can be calculated on a power or signal quality basis.

The centroid is a crude estimator of the UE's location, allowing the selection of a proxy cell whose coverage surrounds this point. For example, an omni-directional antenna's coverage area is centered at its geographic location so that when the closest cell to the centroid is within a predefined range and has an omni-directional antenna pattern, the closest cell can be expected to be a good choice for use as a proxy serving cell.

Figure 4:
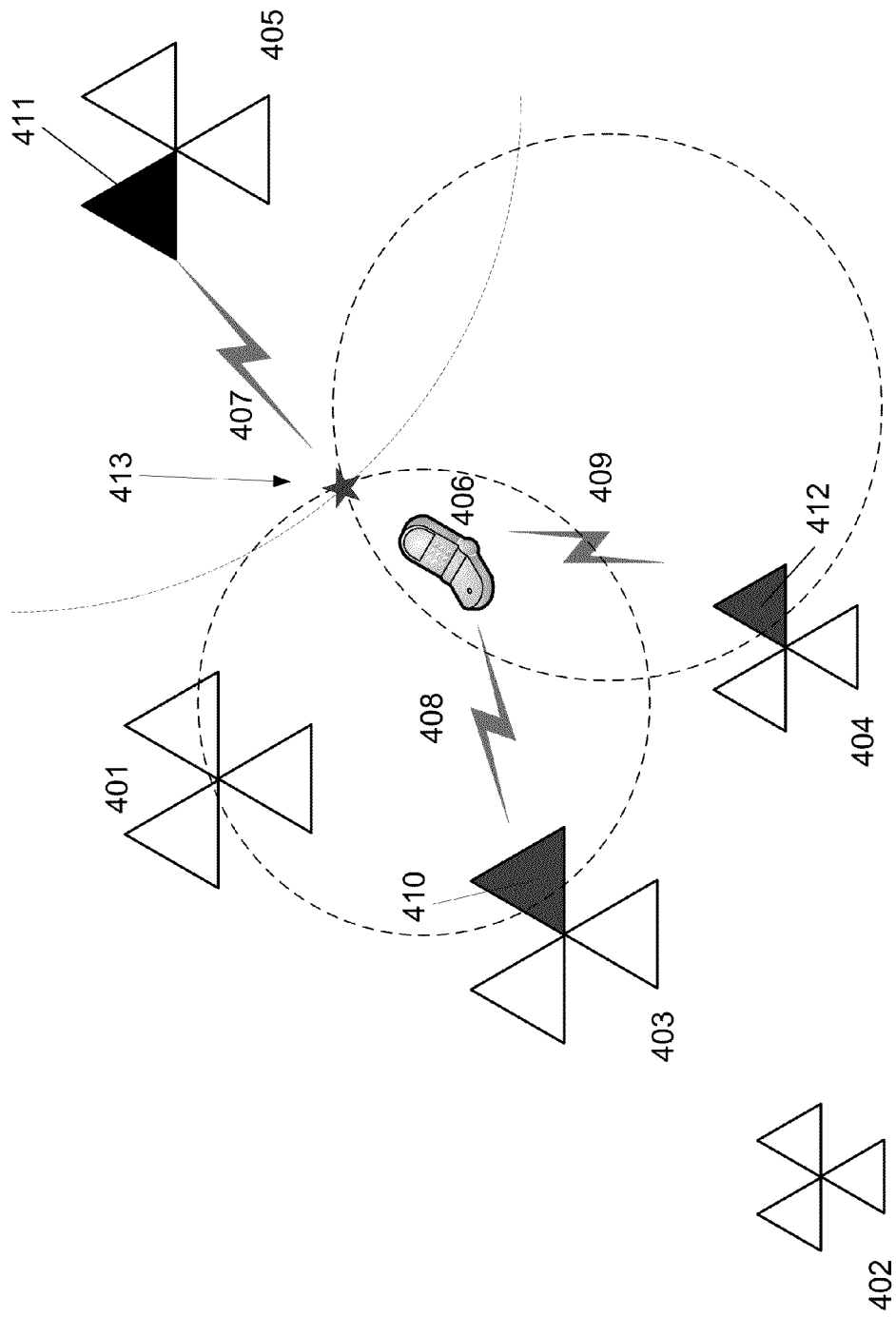
FIG. 4 illustrates an embodiment of Proxy Method 1—Select the Active Set Member Nearest to Centroid as the Proxy

As shown in FIG. 4, it is possible that the cell 401 closest to the centroid 413 is not a member of the active set. Rather than simply picking the closest cell, the closest active set member is selected because the active set members are chosen by the wireless network based on actual received signal quality. Membership in the active set may be a better indicator of usefulness as a cooperative receiver or demodulator than proximity. In FIG. 4, a mobile device 406 is shown in a 3-way softhandoff/softhandover with sectors 410 411 412 via the radio links 407 408 409. As shown, the involved sectors 410 411 412 are associated with base stations/cell sites 403 405 and 404 respectively although multiple sectors associated with the same cell site can be involved. The uninvolved sectors associated with cell sites 401, 402, 403, 404 and 405 can all be potential cooperative or demod sectors.

Proxy Method 2—Select as Proxy Cell the Active Set Member with the Most Active Set Members on its Demodulator List.

In this method, the list of demod LMU sectors for each active set member is examined to see if those demod sectors are themselves members of the active set. If a given cell's demod list contains all the members of the active set, then that sector is chosen as the proxy serving cell.

If no cell's demod sector list contains all active set members, but one or more cells contain some members, then the cell with the greatest number of active set members in its demod list is chosen as the proxy sector.

Figure 5:
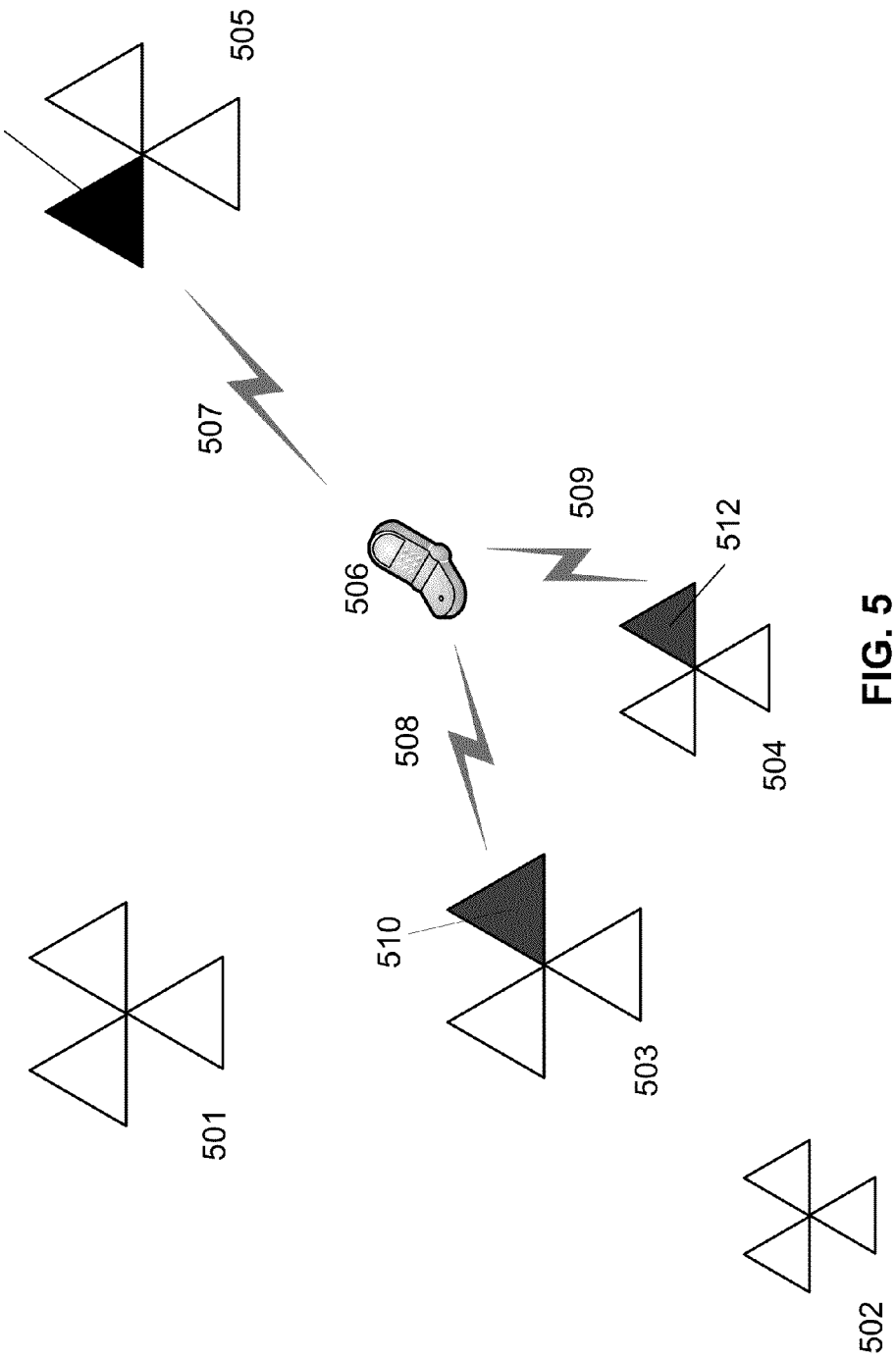
FIG. 5 illustrates an embodiment of Proxy Method 2—Select as Proxy Cell the Active Set Member with the Most Active Set Members on its Demodulating LMU List.

FIG. 5 shows a cellular network made of base stations 501 502 503 504 505. A mobile device 506 is engaged in a soft-handoff with three sectors 510 511 512 using radio links 507 508 509. In this method, the centroid is not calculated; rather the SMLC examines the demod list associated with each of the involved cells 510 511 512, and determines if any of these demod lists includes sectors 510 511 and 512. If the demod list for any active set member cell 510 511 and 512 includes all other active set members 510 511 and 512, then that member cell is selected as the proxy. Otherwise the active set member cell 510 511 and 512 having the demod list that includes the most other active set members 510 511 and 512 is selected as the proxy serving cell.

In case of a tie as to the most included active set members, one of the other proxy methods may be used to break the tie. Alternatively, an arbitrary (deterministic or random) selection of the proxy from the active set may be made.

Proxy Method 3—Select Proxy Cell Based on Coverage Bounding Polygons

In this method a bounding polygon is defined for each sector that fully encompasses all mobile locations at which that sector is expected to serve as an active set member.

During proxy selection, the intersection of the bounding polygons of all active set members is used as a crude estimate of the mobile's position. The sector whose bounding polygon most closely matches the area of the intersection is chosen as the proxy sector. In practice, the sector with the bounding polygon with the smallest area may be selected as proxy.

Figure 6:
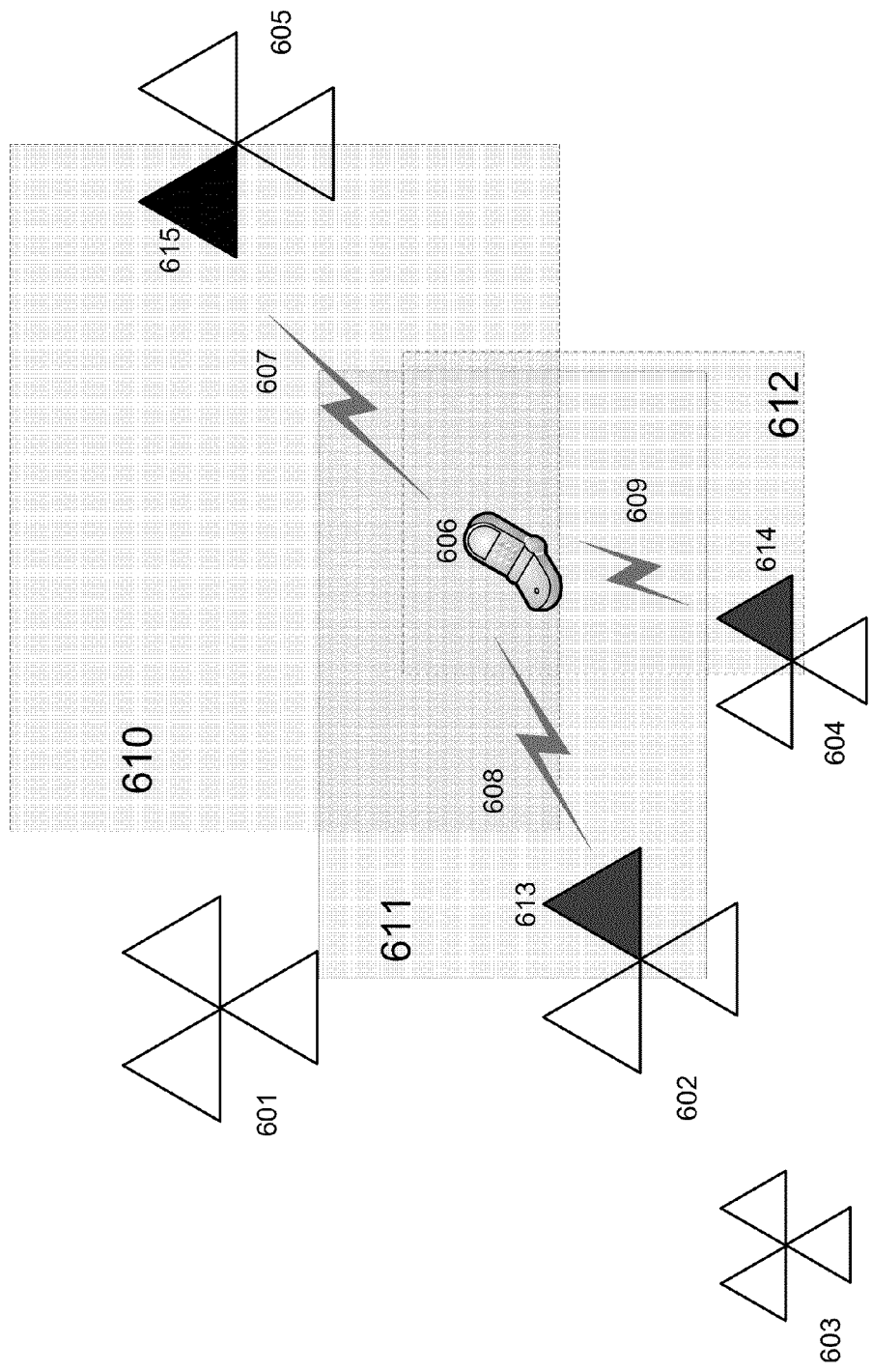
FIG. 6 illustrates an embodiment of Proxy Method 3—Select Proxy Serving Cell Based on Coverage Bounding Polygons FIG. 7 details the general operative steps in performing an Aggregate Method for selection of cooperative and demodulating LMU sectors for a network-based wireless location system.

In FIG. 6, a geographical depiction of the bounding polygon selection of proxy method is shown. The wireless communications network is depicted by the five sectored cells 601 602 603 604 605. The polygon shape used in this example is a rectangle for simplicity of depiction. The bounding rectangles 610 611 612 are sized so as to encompass the entire area of useful radio coverage provided by the involved sectors 613 614 615. The radio links 607 608 609 between the involved sectors 613 614 615 and the wireless device 606 are shown. Using the bounding polygon selection method, sector 614 is selected as the proxy sector.

Aggregate Methods for Location Calculations in a Wireless Communications Network with Soft-Handover While proxy methods discard information in order to select a single cell as the proxy serving cell and allow use of the initial cooperator and demod lists, aggregate methods for selecting cooperators and demod sectors use the information provided by active sets associated with more than one member to generate new cooperator lists and demod lists based on the composition of the whole active set. Aggregate cooperator and demod sector selection requires computing cooperators in real-time based on reported active set members, as the number of possible combinations are extremely large thus making pre-computation difficult for all but the smallest WLSs. This computation in real-time is processor intensive but in most cases yields a better selection of cooperators and demod sectors as compared to proxy methods.

Figure 7:
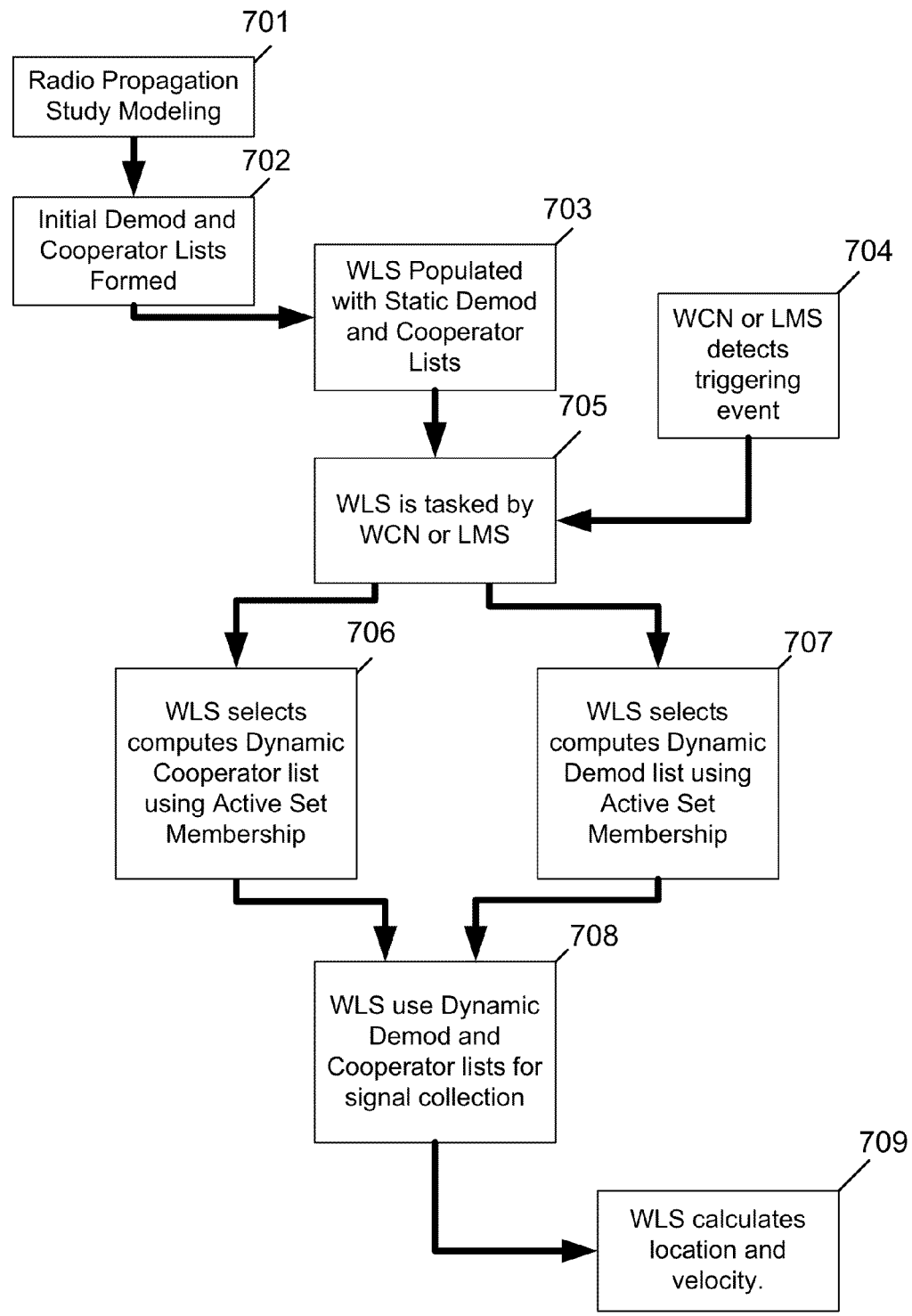

FIG. 7 illustrates the generalized operation of the aggregate methods. A radio propagation model is created for the area 701 and the radio propagation model is used to determine the initial cooperator list and demod sector list for any cell in the WLS service area 702. The deployed wireless location system is populated with the initial lists 703. At some time, the WCN or the LMS signals that a location triggering event has occurred 704, and call-related information which includes the active set details is passed to the WLS 705.

In some designs, the radio propagation modeling 701 may have been performed but the generation of the initial coop and demod lists 702 may not be performed until after tasking information has been received. The radio propagation modeling 701 and generation of the initial coop and demods 702 to pre-populate the WLS 703 may require less computational load to be executed after tasking information has been received and before signal collection can begin. Similarly, in some designs both the radio propagation modeling 701 and the generation of the initial coop and demod lists 702 may not be performed until after tasking information has been received. All such choices are a designer's option.

The WLS, using the newly acquired active set details computes new cooperator 706 and demod sector lists 707. The WLS then uses the newly computed lists to task the LMU network for signal collection 708. Using the reported time differences of arrival and/or angles of arrival, the WLS computes a final location, speed and heading 709 with error estimates for each.

Aggregate Method 1—Construct New Cooperators in a Round-Robin Fashion Based on Octants of Active Set Members.

This method is based on octant structures formed during coop generation for a single serving cell, as described above. Every active set member is segmented into an octant structure as though it were a single serving cell. Then, instead of spiraling around a single site, this method iterates through the octant structures of all the active set members while incrementing the octant number. The net effect is to take coops from every active set member and a range of relative azimuths about each one.

Figure 8A:
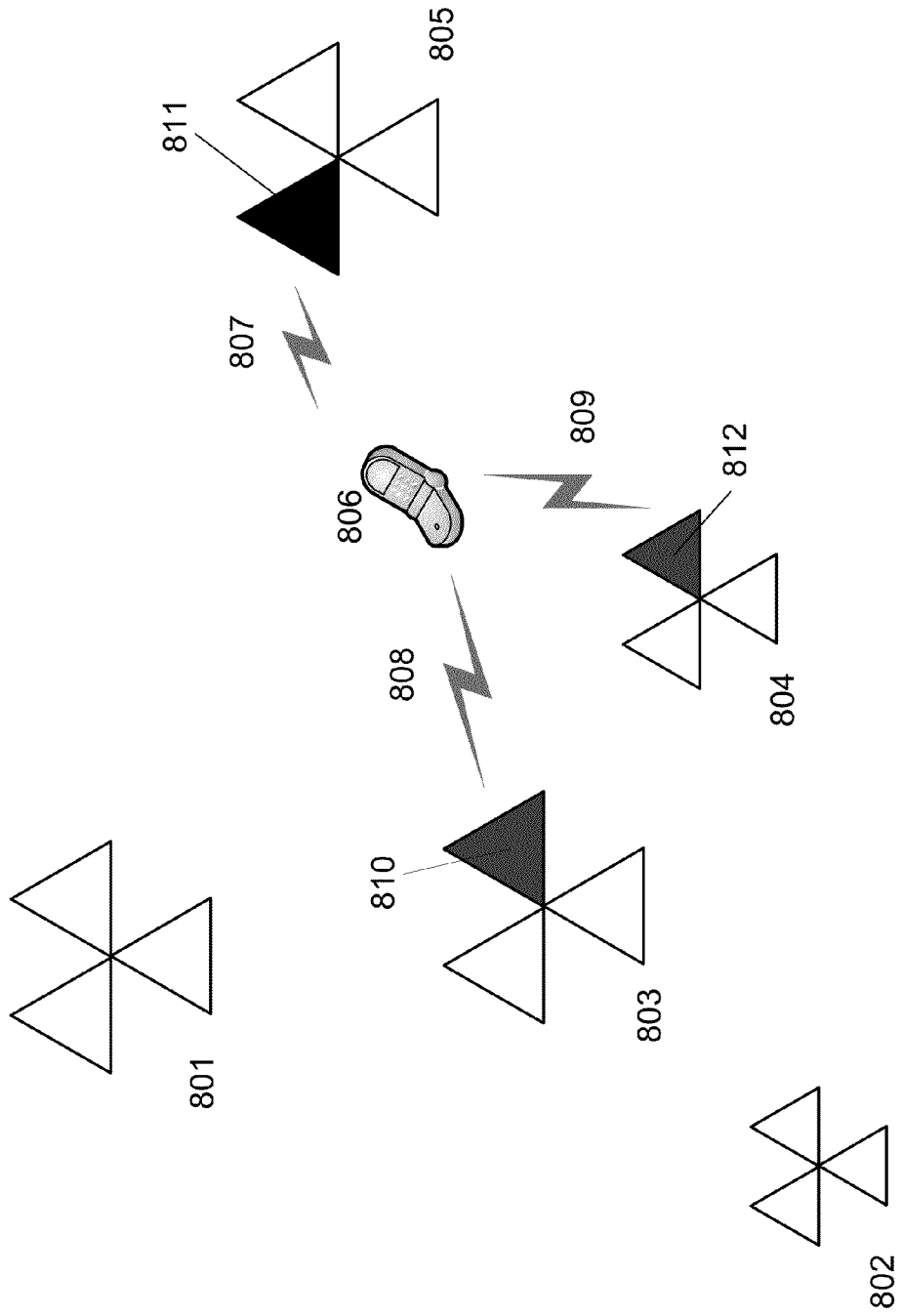
FIG. 8a illustrates an embodiment of Aggregate Method 1—Construction of new cooperators in a round-robin fashion based on octants of active set members.
Figure 8B:
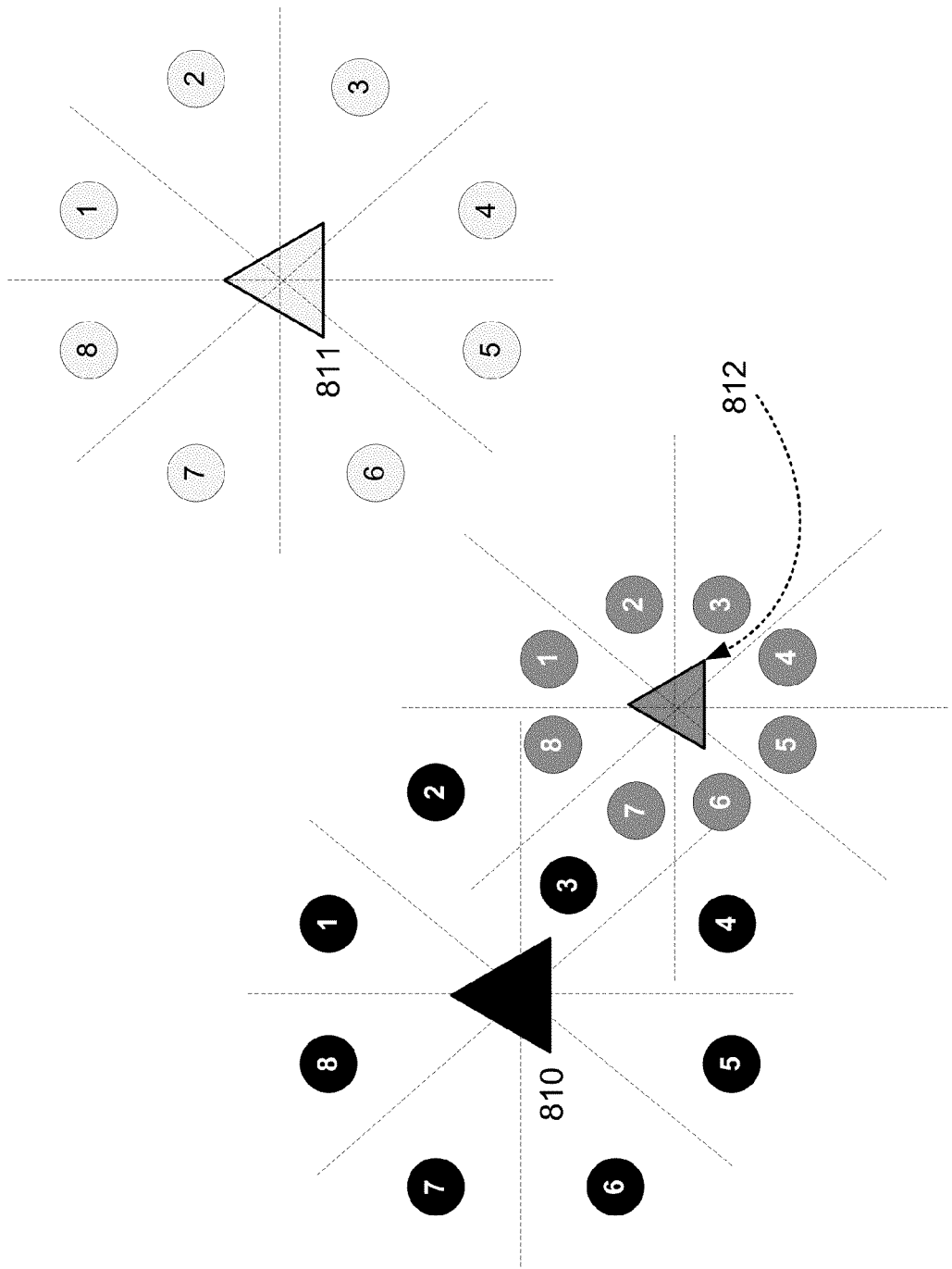
FIG. 8b depicts the Spiral Algorithm as implemented for Aggregate Method 1—Construction of new cooperators in a round-robin fashion based on octants of active set members.

FIG. 8a and FIG. 8b illustrate the use of the active set membership in determining the selection of potential cooperative and demod receivers and the selection of cooperative and demod receivers likely to provide TDOA and AoA coverage for the mobile device.

FIG. 8a depicts a cellular network comprising base stations 801 802 803 804 805. A mobile device 806 is engaged in a soft-handoff with three sectors 810 811 812 using radio links 807 808 809. In this aggregate method, the SMLC recalls the marker points and associated quality metric to every other potential cooperator for the involved cells 810 811 812. The area surrounding each of the involved cells 810 811 812 is then segmented using the radial octant method detailed in FIG. 2c. The SMLC then recalculates a fresh cooperator and demod sector list by selecting the best candidate cooperators based on the quality metrics associated with the sectors in the current radial segment (using eight radial segments as in the example, each segment is one octant). Selection of the current segment is performed in a round-robin fashion by stepping through both the sectors and the octants. For example, the current involved sector may be stepped through in sequential fashion (in FIG. 8b, an acceptable sector pattern would be 810-811-812-810-811-812 . . . ) and the octants may be stepped through following the octant selection pattern 1-4-7-2-5-8-3-6. Thus, for the first 24 cooperators selected the pattern of cells and octants may be as shown in the table in FIG. 8c. The octant selection pattern 1-4-7-2-5-8-3-6 is exemplary and other selection patterns may be used to provide geometric diversity or spatial symmetry.

Selection of a fresh set of cooperators may be continued, repeating the selection of segments from the involved sectors and the election of yet-unelected target sectors to the fresh cooperative receiver list based on the best remaining quality metric until the target number of cooperators is reached or no more target sectors remain. As in step 10 above, once the stopping point is reached, the power of the last LMU sector added is determined. The LMU sectors previously added to the cooperator list is examined and, for each such LMU sector, the LMU sectors not already on the cooperator list that are connected to an antenna and is located in close geographic proximity to its antenna and has average path loss low enough to plausibly be capable of performing a baseline measurement is added to the cooperator list.

A fresh demod sector list is then created. All active set members having an LMU connected are included first in the demod sector list, before (thus at a higher priority than) other demod sectors. If the number of active set members having an LMU connected is more than the limit D from Step 11 above, the number of active set members takes precedence. (The value of D varies according to the network characteristics, but generally falls between 2 and 10). Next, all LMU sectors previously added to the demod list are examined and, for each such sector, LMU sectors not already on the demod list whose antenna is located in close geographic proximity to its antenna, regardless of estimated path loss, is added to the demod list. Other, lower-priority demod sectors are selected (at lower priority, and without duplication) in round-robin fashion from the demod sector lists of the individual active set members, as in the procedure detailed in Step 11 above but following the same round-robin pattern used for coop selection and illustrated in FIGS. 8a, 8b and 8c.

This aggregate method is relatively straightforward, but may not be optimal because it indirectly uses the union of the coverage areas of the active set members rather than the intersection of those areas. Accordingly, this aggregate method may, in some instances, select cooperative receivers that are not optimal candidates. Due to its simple approach, however, this method can still be useful in situations where a large number of cooperative receivers must be accommodated. Like all aggregate methods, this method has the advantage that it incorporates information about the coverage areas of all active set members in the selection of cooperating receivers and demod sectors.

Aggregate method 1 is equally applicable to the construction of coop and demod sector lists for locating mobile units in wireless communication systems that incorporate distributed antenna systems (DAS). A distributed antenna system uses multiple antennas typically located at separate geographic sites to provide radio coverage for a single cell. The coverage area provided by a distributed antenna system is typically significantly larger than the coverage area provided by one of its component antennas.

To apply this method when there is a single serving cell and the receive (uplink) antenna system for that cell is a DAS, that cell's DAS component antennas may be substituted for the active set members of Aggregate Method 1 as though the active set consists of the DAS component antennas. Thus, marker points are used and the associated propagation metrics are calculated for each DAS component antenna and every LMU sector that is connected to one of the DAS component antennas is elected as a demod sector. If the designer or deployer requires more demod sectors than are part of the serving cell's DAS, others may be selected (at lower priority, and without duplication) in round-robin fashion from the demod sector lists of the DAS component elements using the procedure detailed in Step 11 above but following the same round-robin pattern used for coop selection and illustrated in FIGS. 8a, 8b and 8c.

To apply this method when there is an active set consisting of more than one cell and the receive (uplink) antenna system of at least one active set member is a DAS, substitute for the active set members of Aggregate Method 1 the union of all LMU sectors associated with all the non-DAS active set members and all LMU sectors associated with all DAS component antennas of all the DAS active set members, as though the active set consists of all non-DAS active set members and the DAS components of all the DAS active set members. Thus, marker points are used and the associated propagation metrics are calculated for each non-DAS active set member and for each DAS component antenna of any active set member that is a DAS and every LMU sector that is connected to a non-DAS active set member or to one of the DAS component antennas of any active set member is elected as a demod sector. If the designer or deployer requires more demod sectors, others may be taken (at lower priority, and without duplication) in round-robin fashion from the demod sector lists of the DAS component elements, as in the procedure detailed in Step 11 above but following the same round-robin pattern used for coop selection and illustrated in FIGS. 8a, 8b and 8c.

Aggregate Method 2—Construct New Cooperators List Based on Marker Points of Active Set Members This method computes new coop and demod sector lists based on the union of the marker points associated with the active set members. In an embodiment, the above described aggregate method may be extended by segmenting the area surrounding the active set members using radial segments centered at a representative point chosen based on geographic information associated with the active set members. In one embodiment, the centroid of the geographic locations of the active set members is used. The losses to each candidate sector from the marker points of the active set members may be averaged.

Figure 9A:
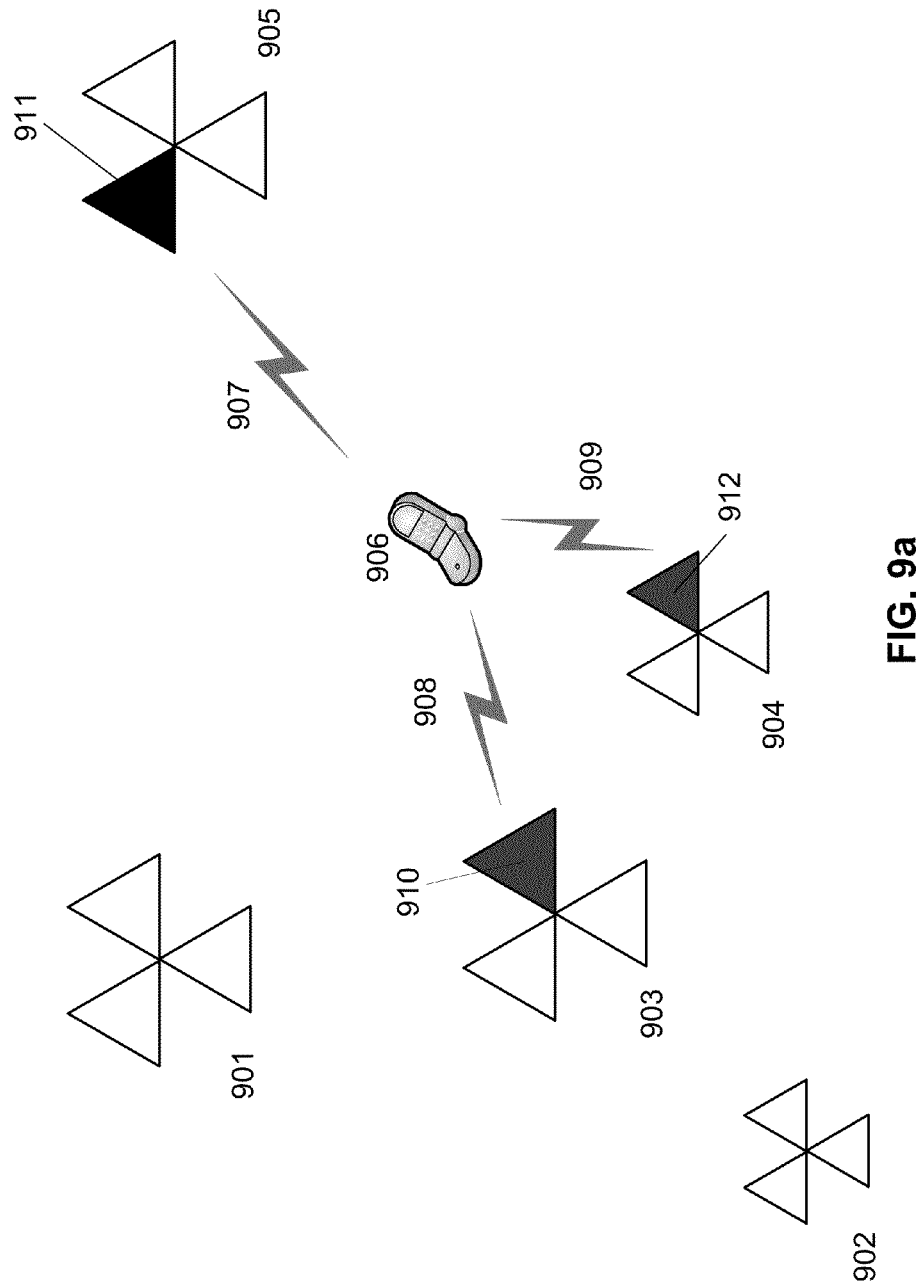
FIG. 9a illustrates an embodiment of Aggregate Method 2—Construct new cooperators list based on marker points of active set members

FIG. 9a illustrates a cellular network made of base stations 901 902 903 904 905. A mobile device 906 is engaged in a soft-handoff with three cells 910 911 912 using radio links 907 908 909. In this aggregate method, the marker points are recalled for all involved cells and the quality metric between all target LMU sectors and each marker point is calculated. The quality metric from each marker point for each involved cell is then averaged so that each potential cooperator (target sector) has a single associated overall quality metric.

Figure 9B:
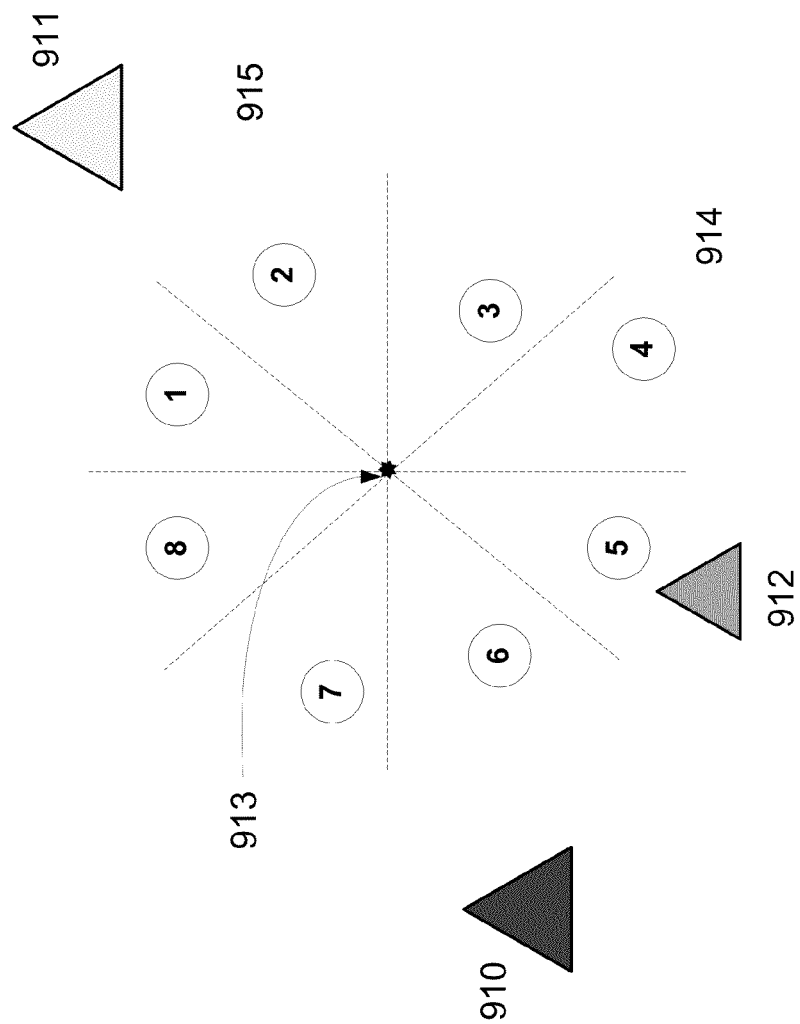
FIG. 9b depicts the Spiral Algorithm as implemented for Aggregate Method 2—Construct new cooperators list based on marker points of active set members

A representative central point for the area covered by the active set is then chosen. In one embodiment, the centroid of the involved sectors is used. FIG. 9b shows the centroid 913. The centroid is found by averaging (separately) the x and y geographic coordinates of the individual sector 910 911 912 receiver antennas. Alternate methods to select a representative central point include calculating a weighted centroid using weights based on a model of power or signal quality.

Once the central point 913 has been determined, the area surrounding the centroid 913 is radially segmented (in this example, the centroid is segmented into octants). While following the octant selection pattern 1-4-7-2-5-8-3-6, fresh sets of cooperators and demodulators are selected by, for each octant in turn, selecting the target sector in the current octant with the best revised quality metric. Selection of a set of cooperators is continued by repeating the selection of segments from the involved cells and the election of yet unselected target sectors to the cooperative receiver list based on best remaining quality metrics until the desired number of cooperators is reached or no more target sectors remain for an octant. Once the stopping point is reached, the power of the last sector added is determined. The LMU sectors previously added to the cooperator list are examined and for each such LMU sector, LMU sectors not already on the cooperator list that are connected to an antenna that is located in close geographic proximity to its antenna and has average path loss low enough to plausibly be capable of performing a baseline measurement are added to the cooperator list.

A fresh demod sector list is then created. All active set members having a connected LMU are included first in the demod sector list, before (thus at a higher priority than) other demod sectors. If the number of active set members having a connected LMU is more than the limit D from Step 11 above, the number of active set members takes precedence. (The value of D varies according to the network characteristics, but generally falls between 2 and 10). Next, examine all LMU sectors previously added to the demod list and for each such sector, add to the demod list every LMU sector not already on the demod list whose antenna is located in close geographic proximity to its antenna, regardless of estimated path loss. Other lower-priority demod sectors are selected using the procedure detailed in Step 11 above, up to but not beyond the limit D.

This method is more computationally intensive in that it requires re-computing the path losses between all the marker points and the candidate sectors, but having these new metrics based on the actual active set members provides a better selection criteria for the cooperating sectors. By selecting each LMU sector based on an estimate of signal quality at marker points representing the coverage areas of all active set members, this method has the potential to be more precise than Aggregate Method 1. Like all aggregate methods, the method incorporates information about the coverage areas of all active set members in the selection of cooperating and demodulating receivers.

Aggregate Method 3—Construct New Cooperators Based on the Coverage Area Common to All Active Set Members.

This method constructs new cooperative and demod receivers based on predicting a common coverage area of all active set members. A new set of marker points is selected to represent the intersecting coverage area. A representative central point for the intersecting coverage area is selected and the octant structure is placed at the central point. The octant structure is populated based on averaging the signal losses from these new marker points to each candidate sector. The above described spiral algorithm is then used to select the cooperative receivers and demod sectors.

Figure 10A:
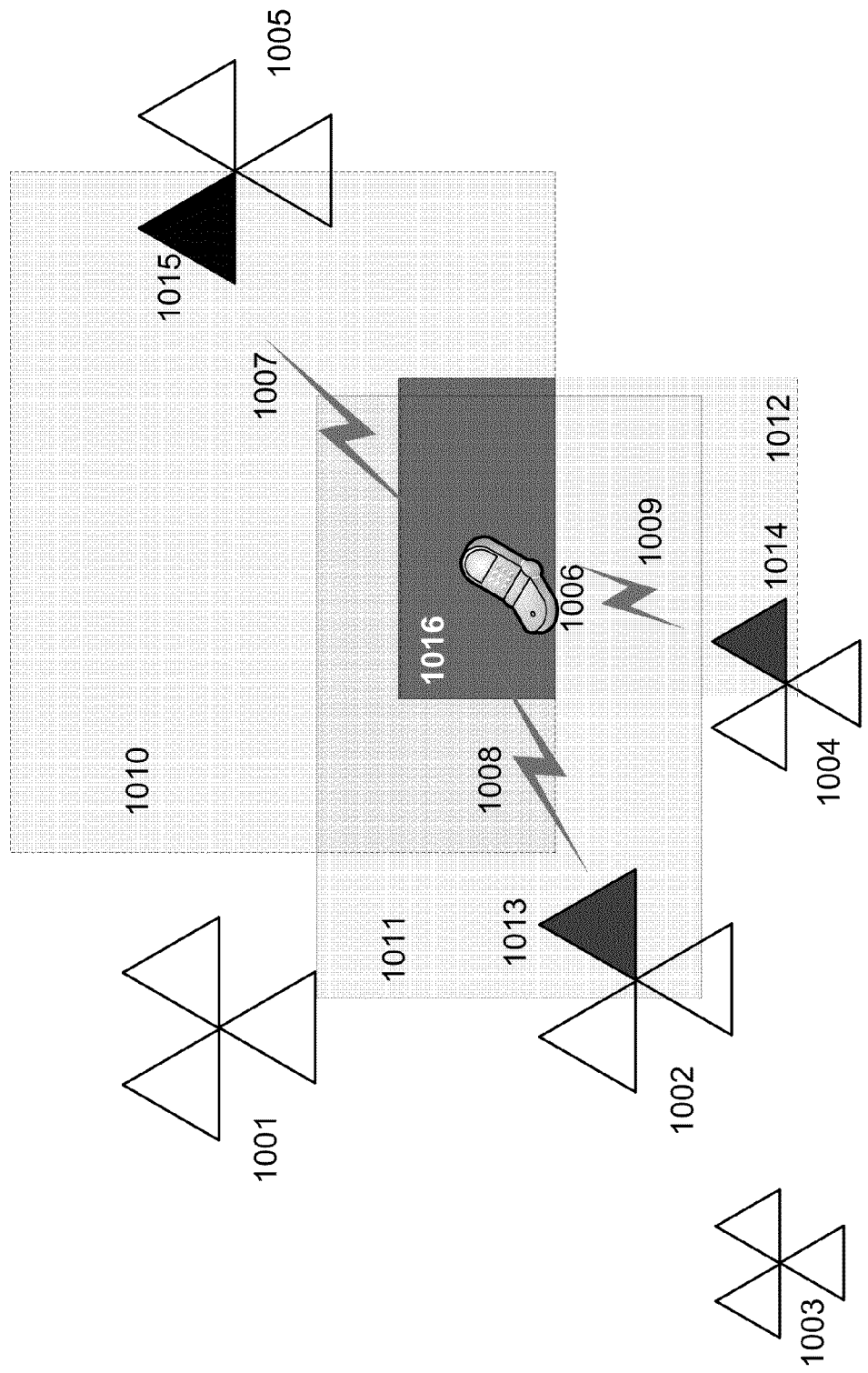
FIG. 10a illustrates an embodiment of Aggregate Method 3, Construct new coops based on the coverage area common to all active set members.

As shown in FIG. 10a, by using a bounding polygon to approximate the sector coverage area for each involved cell, a bounding polygon is created that fully encompasses the geographic area that the involved cell serves.

First, the geographic area that falls into the bounding polygon of every involved sector is determined. In FIG. 10a, the area of geographic overlap 1016 is determined by the bounding polygons (depicted in FIG. 10a as rectangles for ease of depiction). The wireless communications network is depicted by the five sectored cells 1001 1002 1003 1004 1005. The bounding rectangles 1010 1011 1012 are sized so as to encompass the entire area of useful radio coverage provided by the involved sectors 1013 1014 1015. The radio links 1007 1008 1009 between the involved sectors 1013 1014 1015 and the wireless device 1006 are shown.

Once the area of overlap 1016 is determined, a set of h geographically distributed marker points is created. For each of the fresh marker points 1-to-h, the radio propagation model is used to determine a quality metric to every target sector within range. The range is adjustable and dependent on the network topology. The range may be expressed as a distance or as a number of cell radii.

Figure 10B:
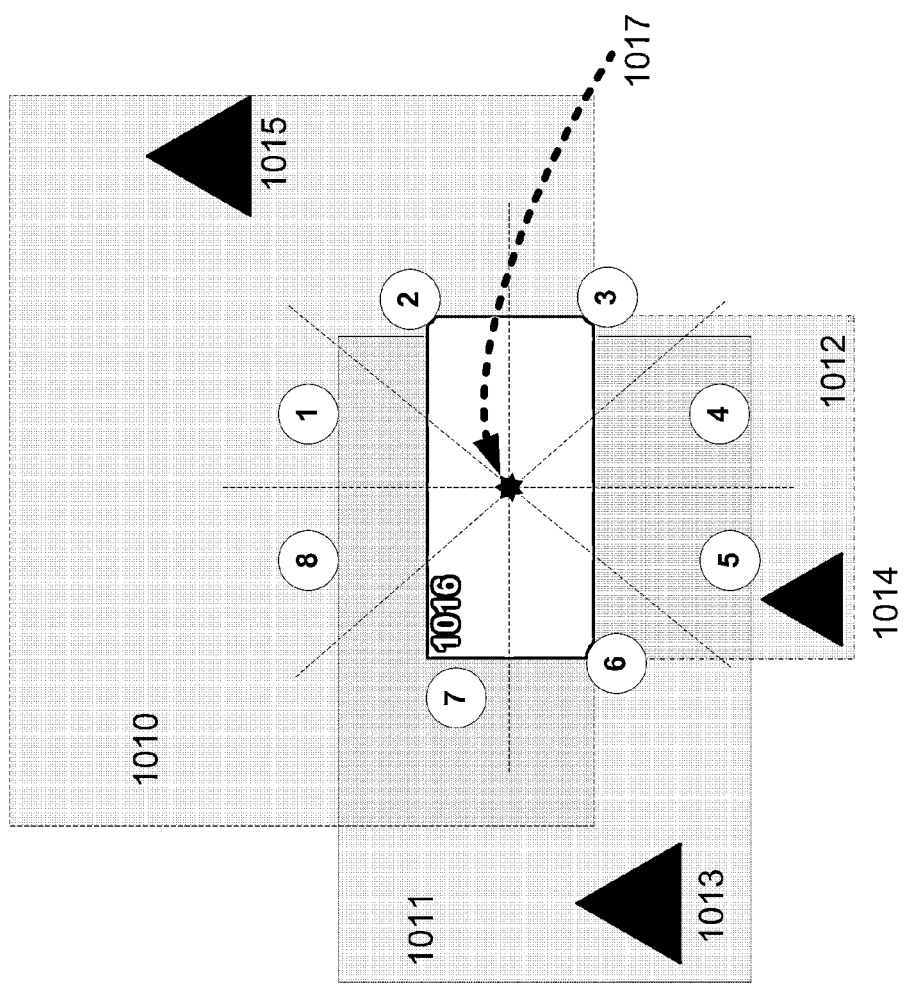
FIG. 10b depicts the Spiral Algorithm as implemented for Aggregate Method 3, Construct new coops based on the coverage area common to all active set members.

Once a fresh quality metric to every target sector within range for each fresh marker point is generated, the quality metrics from each fresh marker point within the area of overlap 1016 are averaged to create a single quality metric for each target sector. As shown in FIG. 10b, the centroid 1017 of the area of overlap 1016 is calculated and the geographic area surrounding the centroid 1017 is radially segmented (in this example, segmentation is again into octants). The radially segmented sections 1-8 are as shown in FIG. 10b, centered on the centroid 1017 of the area of overlap 1016 as calculated from the bounding polygons 1010 1011 1012 derived from the useful radio coverage areas of the involved sectors 1013 1014 1015. Following the octant selection pattern 1-4-7-2-5-8-3-6, a fresh set of cooperator and demod sectors are selected by, for each octant in turn, selecting the target sector in the current octant with the best fresh quality metric. Selection of an updated set of cooperators is continued, repeating the selection of segments from the involved cells and the election of yet unselected target sectors to the fresh cooperative receiver list based on best remaining quality metric until the desired number of cooperators is reached or no more target sectors remain. Once the stopping point is reached, the power of the last sector added is determined. The LMU sectors previously added to the cooperator list are examined and for each such LMU sector, LMU sectors that are not already on the cooperator list connected to an antenna that is located in close geographic proximity to its antenna and has average path loss low enough to plausibly be capable of performing a baseline measurement are added to the cooperator list.

A fresh demod sector list is then created. All active set members having a connected LMU are included first in the demod sector list, before (thus at a higher priority than) other demod sectors. If the number of active set members having a connected LMU is more than the limit D from Step 11 above, the number of active set members takes precedence. (The value of D varies according to the network characteristics, but generally falls between 2 and 10). Next, examine all LMU sectors previously added to the demod list and for each such sector, add to the demod list every LMU sector not already on the demod list whose antenna is located in close geographic proximity to its antenna, regardless of estimated path loss. Other lower-priority demod sectors are selected using the procedure detailed in Step 11 above, up to but not beyond the limit D.

This method (and Proxy Method 3) assumes the determination of useful bounds for sector coverage areas. If the bounds are too loose (meaning that the polygons are larger than necessary), the coop and demod sector selection suffer some loss of precision. If the bounds are too tight, the determination of an intersection may not be possible. A number of techniques may be used to strike a balance between determining bounding polygons that provide an intersection/overlap and yet not making the polygons so large that the results are no longer useful). Such techniques include: 1) allowing more complex polygon shapes and/or 2) using multiple intersecting contours encompassing, e.g., 50%, 70%, or 95% coverage areas, and analyzing the intersection areas to obtain a compact intersection polygon that encloses the likely mobile location. For cases in which a representative intersection cannot be found, other methods may be used for fallback purposes.

Aggregate Method 3 incorporates the additional step of estimating the coverage area of each cell and finding the intersection of those areas. Once that step is taken, this method has the advantage of requiring fewer path loss calculations as they are made from a smaller set of marker points than the union of all the marker points. The resulting metrics may also provide better selection criteria for cooperative receivers because they are computed from a better estimate of the likely location of the mobile device (the intersection of the coverage areas, rather than the union). This method is more complicated compared to Aggregate Method 2 above but provides a closer to optimal representation of Active Set coverage. The trade-off is between computational complexity and potential impacts to location latency vs. location accuracy.

D. CONCLUSION

The use of mobile generated radio quality information as expressed by the generation of the Active Set for CDMA-based wireless communications system represents a distinct improvement over other methods. Use of the disclosed techniques allow for location accuracy improvement without any drive test effort. The participating WLS receiver sites are selected in real time based upon real RF channel conditions (taking into account fading, temporary blocking, etc.) and system throughput is not impacted by over-selection of receiver sites in an attempt to improve accuracy.

The true scope the present invention is not limited to the presently preferred embodiments disclosed herein. For example, the foregoing disclosure of a presently preferred embodiment of a Wireless Location System uses explanatory terms, such as Serving Mobile Location Centers (SMLC), Location Measuring Unit (LMU), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA or AoA techniques. The LMU's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the SMLC) described herein to another functional element (such as the LMU) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

Any of the above mentioned aspects can be implemented in methods, systems, computer readable media, or any type of manufacture. It should be understood to those skilled in the art that the various techniques described herein may be implemented in connection with hardware or software or, where appropriate, with a combination of both. For example, aspects of the invention may execute on a programmed computer. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations. In example embodiments a computer readable storage media can include for example, random access memory (RAM), a storage device, e.g., electromechanical hard drive, solid state hard drive, etc., firmware, e.g., FLASH RAM or ROM, and removable storage devices such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, Bernoulli cartridges, and the like. The computer readable storage media may provide non-volatile storage of processor executable instructions, data structures, program modules and other data for a computer.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for tracking a subject associated with a mobile device. However, other equivalent mechanisms to these described aspects are also contemplated by the teachings herein. Therefore, the present disclosure should not be limited to any single aspect, but rather construed in breadth and scope in accordance with the appended claims.

We claim:

1. A method of identifying a set of cooperator and demodulator location measuring units (LMUs) for use in locating a mobile device in a Code Division Multiple Access (CDMA)-based wireless communications network (WCN), wherein the demodulator LMUs perform full or partial demodulation of an uplink signal from the mobile device and the cooperator LMUs receive the uplink signal from the mobile device without performing demodulation, comprising:

obtaining data identifying an active set of base stations through which active communication is established between the mobile device and the WCN;
based on the active set, identifying at least one cooperator LMU and at least one demodulator LMU;
employing the at least one cooperator LMU and the at least one demodulator LMU to collect signal data from the mobile device; and
employing the signal data to locate the mobile device;
wherein said identifying at least one cooperator LMU and at least one demodulator LMU further comprises:
determining a representative point based on geographic information for the active set and determining a geographic area associated with the representative point; and
dividing the geographic area into radial segments and identifying the at least one cooperator LMU and the at least one demodulator LMU based on the radial segments.

2. A method as recited in claim 1, further comprising detecting a triggering event to initiate location of the mobile device, and communicating triggering information and tasking information to a wireless location system (WLS), wherein the tasking information includes active set membership information.

3. A method as recited in claim 1, wherein the representative point is a geographic centroid.

4. A method as recited in claim 3, wherein the geographic centroid is determined by averaging the geographic coordinates of the base stations in the active set.

5. A method as recited in claim 3, wherein the geographic centroid is determined as a function of signal power levels received from the base stations.

6. A method as recited in claim 3, wherein the geographic centroid is determined as a function of signal quality metrics associated with the base stations.

7. A method of identifying a set of cooperator and demodulator location measuring units (LMUs) for use in locating a mobile device in a Code Division Multiple Access (CDMA)-based wireless communications network (WCN), wherein the demodulator LMUs perform full or partial demodulation of an uplink signal from the mobile device and the cooperator LMUs receive the uplink signal from the mobile device without performing demodulation, comprising:

obtaining data identifying an active set of base stations through which active communication is established between the mobile device and the WCN;
based on the active set, identifying at least one cooperator LMU and at least one demodulator LMU;
employing the at least one cooperator LMU and the at least one demodulator LMU to collect signal data from the mobile device; and
employing the signal data to locate the mobile device;
wherein said identifying at least one cooperator LMU and at least one demodulator LMU further comprises:
determining a common coverage area for the active set and a geographic centroid for the common coverage area; and
dividing the common coverage area into radial segments centered around the geographic centroid and identifying the at least one cooperator LMU and the at least one demodulator LMU based on the radial segments.

8. A system configured to identify a set of cooperator and demodulator signal collection receivers for use in locating a mobile device in a Code Division Multiple Access (CDMA)-based wireless communications network (WCN), the system comprising at least one processor and at least one storage medium communicatively coupled to said at least one processor, the storage medium having stored therein computer-executable instructions for instructing the processor in causing the following steps:

obtaining data identifying an active set of base stations through which active communication is established between the mobile device and the WCN;

based on the active set, identifying at least one cooperator receiver and at least one demodulator receiver;

employing the at least one cooperator receiver and the at least one demodulator receiver to collect signal data from the mobile device; and employing the signal data to locate the mobile device;

wherein said identifying at least one cooperator receiver and at least one demodulator receiver further comprises:

determining a representative point based on geographic information for the active set and determining a geographic area associated with the representative point; and dividing the geographic area into radial segments and identifying the at least one cooperator receiver and the at least one demodulator receiver based on the radial segments.

9. The system of claim 8, wherein the representative point is a geographic centroid.

10. The system of claim 9, wherein the geographic centroid is determined by averaging the geographic coordinates of the base stations in the active set.

11. The system of claim 9, wherein the geographic centroid is determined as a function of signal power levels received from the base stations.

12. The system of claim 9, wherein the geographic centroid is determined as a function of signal quality metrics associated with the base stations.

13. A non-transitory computer readable storage medium storing thereon computer executable instructions for identifying a set of cooperator and demodulator signal collection receivers for use in locating a mobile device in a Code Division Multiple Access (CDMA)-based wireless communications network (WCN), said computer executable instructions for:

obtaining data identifying an active set of base stations through which active communication is established between the mobile device and the WCN;

based on the active set, identifying at least one cooperator receiver and at least one demodulator receiver;

employing the at least one cooperator receiver and the at least one demodulator receiver to collect signal data from the mobile device; and employing the signal data to locate the mobile device;

wherein said instructions for identifying at least one cooperator receiver and at least one demodulator receiver comprise:

instructions for determining a representative point based on geographic information for the active set and determining a geographic area associated with the representative point; and instructions for dividing the geographic area into radial segments and identifying the at least one cooperator receiver and the at least one demodulator receiver based on the radial segments.

14. The non-transitory computer readable storage medium of claim 13, wherein the representative point is a geographic centroid.

15. The non-transitory computer readable storage medium of claim 14, wherein the geographic centroid is determined by averaging the geographic coordinates of the base stations in the active set.

16. The non-transitory computer readable storage medium of claim 14, wherein the geographic centroid is determined as a function of signal power levels received from the base stations.

17. The non-transitory computer readable storage medium of claim 14, wherein the geographic centroid is determined as a function of signal quality metrics associated with the base stations.

18. A non-transitory computer readable storage medium storing thereon computer executable instructions for identifying a set of cooperator and demodulator signal collection receivers for use in locating a mobile device in a Code Division Multiple Access (CDMA)-based wireless communications network (WCN), said computer executable instructions for:

obtaining data identifying an active set of base stations through which active communication is established between the mobile device and the WCN;

based on the active set, identifying at least one cooperator receiver and at least one demodulator receiver;

employing the at least one cooperator receiver and the at least one demodulator receiver to collect signal data from the mobile device; and employing the signal data to locate the mobile device;

wherein said instructions for identifying at least one cooperator receiver and at least one demodulator receiver comprise:

instructions for determining a common coverage area for the active set and a geographic centroid for the common coverage area; and instructions for dividing the common coverage area into radial segments centered around the geographic centroid and identifying the at least one cooperator receiver and the at least one demodulator receiver based on the radial segments.

19. The non-transitory computer readable storage medium of claim 18, wherein said instructions for determining a common coverage area further comprise instructions for employing a bounding polygon to approximate a geographic coverage area for each base station and determining an area of overlap as the common coverage area.

20. The non-transitory computer readable storage medium of claim 18, further comprising instructions for determining geographically distributed marker points within the common coverage area and, for each of the marker points, using the radio propagation model to determine a quality metric for sectors within a predetermined range of the common coverage area.

21. The non-transitory computer readable storage medium of claim 20, further comprising instructions for averaging the quality metrics from each marker point to determine the quality metric for each sector.

22. A system configured to identify a set of cooperator and demodulator signal collection receivers for use in locating a mobile device in a Code Division Multiple Access (CDMA)-based wireless communications network (WCN), the system comprising at least one processor and at least one storage medium communicatively coupled to said at least one processor, the storage medium having stored therein computer-executable instructions for instructing the processor in causing the following steps:

obtaining data identifying an active set of base stations through which active communication is established between the mobile device and the WCN;

based on the active set, identifying at least one cooperator receiver and at least one demodulator receiver;

employing the at least one cooperator receiver and the at least one demodulator receiver to collect signal data from the mobile device; and employing the signal data to locate the mobile device;

wherein said identifying at least one cooperator receiver and at least one demodulator receiver further comprises:

determining a common coverage area for the active set and a geographic centroid for the common coverage area; and dividing the common coverage area into radial segments centered around the geographic centroid and identifying the at least one cooperator receiver and the at least one demodulator receiver based on the radial segments.

\* \* \* \* \*